US009132785B2

(12) United States Patent
Roach et al.

(10) Patent No.: US 9,132,785 B2
(45) Date of Patent: *Sep. 15, 2015

(54) COLLAPSIBLE AUTOMOTIVE STORAGE CONTAINER

(71) Applicants: Robert Roach, Holt, MI (US); Craig Wieland, Mason, MI (US)

(72) Inventors: Robert Roach, Holt, MI (US); Craig Wieland, Mason, MI (US)

( * ) Notice: Subject to any disclaimer, the term of this patent is extended or adjusted under 35 U.S.C. 154(b) by 60 days.

This patent is subject to a terminal disclaimer.

(21) Appl. No.: 14/076,926

(22) Filed: Nov. 11, 2013

(65) Prior Publication Data

US 2014/0175137 A1    Jun. 26, 2014

Related U.S. Application Data

(63) Continuation-in-part of application No. 13/447,163, filed on Apr. 13, 2012, now Pat. No. 8,701,950, which is a continuation-in-part of application No. 13/087,140, filed on Apr. 14, 2011, now abandoned.

(51) Int. Cl.
*B60R 9/06* (2006.01)
*B60P 7/08* (2006.01)

(52) U.S. Cl.
CPC ............... *B60R 9/065* (2013.01); *B60P 7/0892* (2013.01)

(58) Field of Classification Search
USPC ......... 224/404, 403, 495, 497, 539, 542, 549; 296/37.1, 37.6, 37.14; 312/258–262; 108/11, 14, 51.3, 157.14; 220/6
See application file for complete search history.

(56) References Cited

U.S. PATENT DOCUMENTS

| | | |
|---|---|---|
| 954,918 A | 4/1910 | Biro |
| 1,444,487 A | 2/1923 | Volters |
| 1,449,419 A | 3/1923 | Kraus |
| 1,489,527 A | 4/1924 | Henry |
| 2,529,983 A | 11/1950 | White |
| 3,995,764 A | 12/1976 | Zagami |
| 4,230,227 A | 10/1980 | Kowall et al. |
| 4,260,091 A | 4/1981 | French et al. |
| D274,139 S | 6/1984 | Suffern et al. |
| 4,673,087 A | 6/1987 | Webb |
| 4,828,312 A | 5/1989 | Kinkel et al. |
| 4,848,618 A | 7/1989 | Yuan et al. |

(Continued)

OTHER PUBLICATIONS

The United States Patent and Trademark Office, "Notice of Allowance", issued in connection with U.S. Appl. No. 29/449,629, mailed on Sep. 12, 2014, 29 pages.

(Continued)

*Primary Examiner* — Justin Larson
*Assistant Examiner* — Phillip Schmidt
(74) *Attorney, Agent, or Firm* — Hanley, Flight and Zimmerman, LLC

(57) ABSTRACT

In an embodiment, a collapsible storage container for a bed of a vehicle includes a set of panels, a connection system, and a support system. The set of panels are configured to form an enclosed area in a bed of a vehicle. The set of panels are movable into a collapsed state and an uncollapsed state. In the collapsed state, the set of panels allow for substantially all of the bed of the pickup truck to be used. In the uncollapsed state, the set of panels form an enclosed area. The connection system connects the set of panels together such that the panels are movable into a collapsed state and an uncollapsed state. The support system is attached to a front panel to provide support when the front panel is in the uncollapsed position, wherein the front panel is movable to slide under a base of the collapsible storage container.

18 Claims, 60 Drawing Sheets

(56) References Cited

U.S. PATENT DOCUMENTS

| | | | |
|---|---|---|---|
| 4,875,730 A | 10/1989 | Justice | |
| 5,226,302 A | 7/1993 | Anderson | |
| 5,299,704 A | 4/1994 | Thorby | |
| 5,341,950 A * | 8/1994 | Sinz | 220/6 |
| 5,368,210 A | 11/1994 | Wotring | |
| 5,456,514 A | 10/1995 | Justice | |
| 5,782,372 A | 7/1998 | Weiss et al. | |
| 5,853,116 A | 12/1998 | Schreiner | |
| 5,862,932 A | 1/1999 | Walsh et al. | |
| 5,875,912 A | 3/1999 | Hobson | |
| 6,015,178 A | 1/2000 | Haack | |
| 6,070,775 A | 6/2000 | Tolley et al. | |
| D430,103 S | 8/2000 | Scudder | |
| 6,254,162 B1 | 7/2001 | Faber et al. | |
| 6,267,427 B1 | 7/2001 | Ziehl | |
| 6,308,873 B1 | 10/2001 | Baldas et al. | |
| 6,401,995 B1 | 6/2002 | Yuille et al. | |
| 6,454,148 B1 | 9/2002 | Cook | |
| 6,507,701 B2 | 1/2003 | Lake | |
| 6,536,826 B1 | 3/2003 | Reed | |
| 6,644,710 B2 | 11/2003 | Seel et al. | |
| 6,749,077 B1 | 6/2004 | McAlpine et al. | |
| 6,827,385 B2 | 12/2004 | Mobley | |
| 6,938,807 B2 | 9/2005 | Victor | |
| 6,986,541 B1 | 1/2006 | Haack | |
| 7,097,224 B2 | 8/2006 | Lester et al. | |
| 7,290,820 B1 | 11/2007 | Smith et al. | |
| D658,373 S | 5/2012 | Gros | |
| D659,632 S | 5/2012 | Jordan | |
| D660,781 S | 5/2012 | Ruffino et al. | |
| 8,215,693 B2 | 7/2012 | Ulita | |
| 8,701,950 B2 | 4/2014 | Roach et al. | |
| D722,009 S | 2/2015 | Roach et al. | |
| 8,960,756 B2 | 2/2015 | Roach et al. | |
| 2001/0017474 A1 | 8/2001 | Leitner et al. | |
| 2002/0175530 A1 | 11/2002 | Lake | |
| 2003/0085584 A1 | 5/2003 | Golden | |
| 2003/0098591 A1 | 5/2003 | Leitner et al. | |
| 2004/0232016 A1 | 11/2004 | Dietrich | |
| 2005/0242138 A1 | 11/2005 | Warganich | |
| 2006/0266778 A1 | 11/2006 | Allotey | |
| 2007/0119093 A1 | 5/2007 | Jaskulski | |
| 2008/0264946 A1 | 10/2008 | Moschella et al. | |
| 2009/0056592 A1 | 3/2009 | Threet et al. | |
| 2009/0189404 A1 | 7/2009 | Anderson et al. | |
| 2009/0255967 A1 | 10/2009 | Lueder | |
| 2009/0321434 A1 | 12/2009 | Rothschild et al. | |
| 2010/0252468 A1 | 10/2010 | Pratte et al. | |
| 2010/0264180 A1 | 10/2010 | Allotey | |
| 2010/0270821 A1 | 10/2010 | Ulita | |
| 2010/0320793 A1 | 12/2010 | Aebker et al. | |
| 2012/0181810 A1 | 7/2012 | Alvarino | |
| 2012/0261451 A1 | 10/2012 | Roach et al. | |
| 2012/0261452 A1 | 10/2012 | Roach et al. | |
| 2012/0261938 A1 | 10/2012 | Roach et al. | |
| 2014/0062042 A1 | 3/2014 | Wagner et al. | |
| 2014/0326764 A1 | 11/2014 | Roach et al. | |
| 2014/0346205 A1 | 11/2014 | Roach et al. | |

OTHER PUBLICATIONS

United States Patent and Trademark Office, "Non-Final Office action", issued in connection with U.S. Appl. No. 13/446,447, mailed on Mar. 18, 2014, 14 pages.

United States Patent and Trademark Office, "Notice of Allowance", issued in connection with U.S. Appl. No. 13/447,163, mailed on Feb. 3, 2014, 58 pages.

United States Patent and Trademark Office, "Non-Final Office action" issued in connection with U.S. Appl. No. 13/447,163, mailed on Apr. 1, 2013, 17 Pages.

United States Patent and Trademark Office, "Final Office action" issued in connection with U.S. Appl. No. 13/447,163, mailed on Jul. 18, 2013, 21 Pages.

United States Patent and Trademark Office, "Advisory action" issued in connection with U.S. Appl. No. 13/447,163, mailed on Oct. 10, 2013, 3 Pages.

United States Patent and Trademark Office, "Non-Final Office action" issued in connection with U.S. Appl. No. 13/087,140, mailed on Dec. 28, 2012, 13 Pages.

United States Patent and Trademark Office, "Final Office action" issued in connection with U.S. Appl. No. 13/087,140, mailed on Apr. 25, 2013, 19 Pages.

United States Patent and Trademark Office, "Non-Final Office action" issued in connection with U.S. Appl. No. 13/446,447, mailed on Aug. 6, 2013, 12 Pages.

The United States Patent and Trademark Office, "Notice of Allowance", issued in connection with U.S. Appl. No. 13/446,447, mailed on Nov. 13, 2014, pp. 15.

United States Patent and Trademark Office, "Final Office Action" issued in connection with U.S. Appl. No. 13/446,447, mailed on Jul. 9, 2014, 10 pages.

United States Patent and Trademark Office, "Non-Final office action", issued in connection with U.S. Appl. No. 14/454,409, mailed on Jun. 5, 2015, 52 pages.

United States Patent and Trademark Office, "Non-Final office action", issued in connection with U.S. Appl. No. 14/270,052, mailed on May 19, 2015, 55 pages.

* cited by examiner

COLLAPSIBLE AUTOMOTIVE STORAGE CONTAINER

CROSS-REFERENCE TO RELATED APPLICATIONS

The present application claims the benefit of and priority to U.S. patent application Ser. No. 13/447,163, filed on Apr. 13, 2012, for "Collapsible Automobile Storage Container," now U.S. Pat. No. 8,701,950 which claims the benefit of and priority to U.S. patent application Ser. No. 13/087,140, filed on Apr. 14, 2011, for "Collapsible Storage Container for a Bed of a Truck", now abandoned, each of which is incorporated herein by reference in its entirety.

BACKGROUND

The present embodiments generally relate to collapsible storage containers for automobiles, such as pickup trucks, sports utility vehicles and the like.

A pickup truck (which may be referred to as a truck) is a motor vehicle or automobile with an open-top rear cargo area which is generally (but does not have to be) separated from a cabin to allow for chassis flex when carrying or pulling heavy loads. The open-top rear cargo area is generally referred to as the bed of the truck. The bed of the truck is generally configured to store, carry, or haul various items. However, because the bed of the truck has an open top (i.e., is not covered), the various items are generally exposed to the weather and/or the possibility of theft. Furthermore, because of the bed of the truck is generally sized to store, carry, or haul larger items (e.g., gravel and wood), smaller items (e.g., groceries or tools) may slide around the bed of the truck. For some items, such as gravel, wood, and landscaping items, being exposed to the possibility of weather, theft, and sliding around is generally not a problem. However, for other items, such as carpentry tools, groceries, and clothes, being exposed to the possibility of weather, theft, and sliding around is generally not acceptable. In some situations, the person using the truck may choose to place these items in the cabin of the truck to prevent exposure.

BRIEF DESCRIPTION OF THE DRAWINGS

Example embodiments are described herein with reference to the following drawings.

Figure 1A:
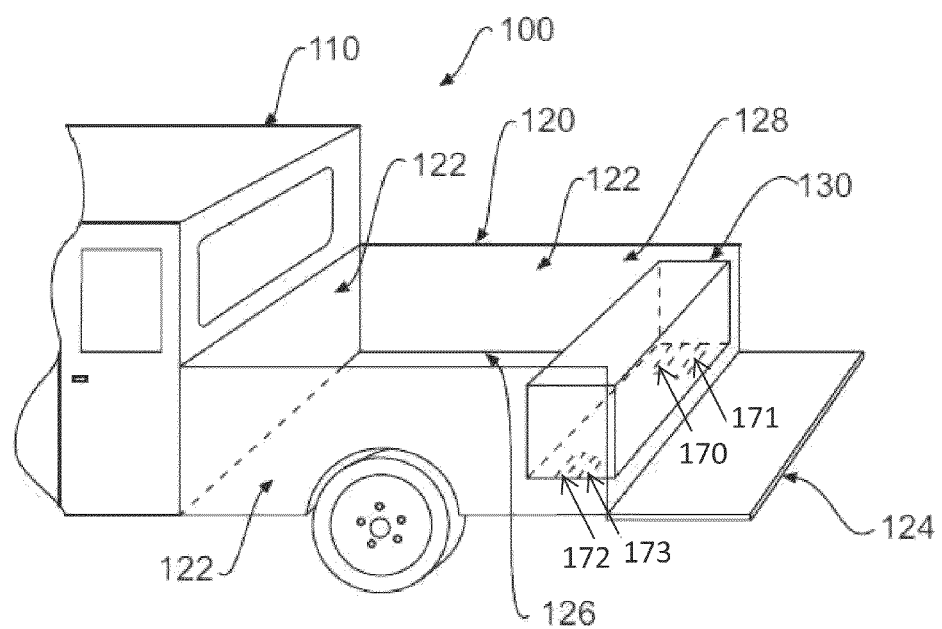
FIGS. 1A-1E illustrate examples of a collapsible storage container in a back of a vehicle such as a truck.

The following detailed description may be better understood when read in conjunction with the drawings which show certain example embodiments. The drawings are for the purpose of illustrating concepts, but it is understood that the inventions are not limited to the arrangements and instrumentality shown in the drawings.

DESCRIPTION

Brief Description

The present embodiments relate to a collapsible storage container (CSC) for an automobile, such as a truck, sport utility vehicle (SUV), all-terrain vehicle (ATV) (e.g., quad, quad bike, three wheeler, four wheeler, etc.), recreational vehicle (RV), and the like. Flat cargo trailers (e.g., for transport of snow-mobiles, motorcycles, ATVs, etc.) can also utilize a collapsible storage container (e.g., collapsing the container while using the trailer to transport the vehicle and then erecting the container to store belongings while using the transported vehicle).

The collapsible storage container is a storage container that may be collapsed or uncollapsed. When collapsed, the storage container allows for all or substantially all of an available area, such as a bed of a truck, a flatbed trailer, etc., to be used. However, when uncollapsed, the storage container may protect items placed in the interior of the storage container from the possibility of weather, theft, and sliding around the vehicle (e.g., the bed of the truck). The collapsible storage container may transition, either manually or electronically, between a collapsed position and uncollapsed position. As a result, for example, the collapsible storage container allows a user to utilize a storage container in the available area, such as the bed of the truck (e.g., when the collapsible storage container is uncollapsed/erected) vertically or horizontally, but also utilize substantially the entire available area, such as the bed of the truck (e.g., when the collapsible storage container is collapsed). In certain examples, the collapsible storage container can be arranged horizontally (e.g., laying flat on a bed of a truck, trailer, etc.) and/or vertically (e.g., positioned against a sidewall of a vehicle, etc.).

As used herein, the term "collapsible" includes foldable, pivotable, expandable, and/or otherwise movable into and out of a collapsed position and/or uncollapsed position. "Collapsed" may include caved in, folded, pivoted, broke down, reduced in size, or otherwise moved from an uncollapsed position to a collapsed position. "Uncollapsed" may include extended, elongated, enlarged, expanded, fanned out, heightened, increased, lengthened, let out, opened, prolonged, prolongated, raised, spun out, spreaded, stretched, unfolded, unrolled, widened, or otherwise moved from a collapsed position to an uncollapsed position. As used herein, "uncollapsed" may also be referred to as "erected."

Certain examples provide a collapsible storage container that is completely integrated so that all four sides as well as top and bottom are attached to each other and do not need to be separately handled or stored in either the collapsed or un-collapsed position. Thus, a person can choose to store items in the container in a truck bed, trailer bed, jeep storage space, etc., without fear of spillage, etc.

Certain examples provide a collapsible storage container for a bed of a vehicle includes a set of panels, a connection system, and a support system. The set of panels are configured to form an enclosed area in a bed of a vehicle. The set of panels are movable into a collapsed state and an uncollapsed state. In the collapsed state, the set of panels allow for substantially all of the bed of the pickup truck to be used. In the uncollapsed state, the set of panels form an enclosed area. The connection system connects the set of panels together such that the panels are movable into a collapsed state and an uncollapsed state. The support system is attached to a front panel to provide support when the front panel is in the uncollapsed position, wherein the front panel is movable to slide under a base of the collapsible storage container. The support system includes one or more trusses attached to the front panel to provide support to the base when the container is in the uncollapsed position. Each of the one or more trusses has at a front and a side, the front of the truss being smaller than the side of the truss. The front of each truss is attached to a bottom of the front panel. The side of each truss is to be oriented along a direction of movement of the front panel to allow the one or more trusses to be pulled forward with the front panel and to provide support to the base.

In an embodiment, a collapsible storage container for a bed of a pickup truck includes a set of panels, a connection system, and an attachment system. The set of panels are configured to form an enclosed area in a bed of a pickup truck. The set of panels are movable into a collapsed position and an uncollapsed position. The set of panels, in the collapsed position, may be used as the bed of the pickup truck. The connection system connects the set of panels together. The connection system allows the set of panels to be movable into the collapsed position and the uncollapsed position. The attachment system is configured to connect the set of panels to the bed of the pickup truck, a cargo trailer, etc.

In another embodiment, a system includes a storage container. The storage container is configured to be moved into and out of a collapsed position. The storage container includes an attachment system that is configured to connect the storage container to a bed of a pickup truck. The storage container includes an enclosed area that is located in an open-top cargo area of the bed of the pickup truck when the storage container is moved out of the collapsed position.

In yet another embodiment, a bed of a pickup truck includes an open-top cargo area. The open-top cargo area is located between one or more side walls, a tailgate, and a floor. The open-top cargo area is sized to receive a collapsible storage container. Either one or more of the side walls, the tailgate, or the floor are configured to receive the collapsible storage container. The collapsible storage container is configured to be moved into and out of a collapsed position. The collapsible storage container includes an attachment system that is configured to connect the storage container to either of the one or more side walls, the tailgate, or the floor. The storage container includes an enclosed area that is located in an open-top cargo area of the bed of the pickup truck when the storage container is moved out of the collapsed position.

Reference herein to "embodiment" means that a feature, structure, or characteristic described in connection with the embodiment can be included in at least one embodiment. The appearance of this phrase in various places in the specification is not necessarily all referring to the same or single embodiment or even different and mutually exclusive embodiments. Separate or alternative embodiments are not mutually exclusive embodiments. Instead, the embodiments described herein, explicitly and implicitly understood by one skilled in the art, may be combined with other embodiments. The embodiments and combinations thereof are all within the scope of this patent document.

It is also worth noting that unless stated otherwise the various embodiments disclosed herein are not limited in their application to the details of design and arrangement of the components set forth in the previous and following description or as illustrated in the drawings. Instead, the previous description, following description, and the drawings focus on presenting concepts of various embodiments. The embodiments described herein may stand alone or be combined with each other.

One or more of the embodiments may be embodied as a method, system, article of manufacture, apparatus, or device. It should be noted that the methods, systems, articles of manufacture, apparatus, and devices provided herein are merely illustrative and should not be considered as limiting. Accordingly, while the following describes example methods, systems, articles of manufacture, and apparatus, the examples provided are not the only way to implement such methods, systems, articles of manufacture, and apparatus.

DETAILED DESCRIPTION

FIG. 1A illustrates a truck 100. The truck 100 is described and disclosed herein for purposes of example illustration only. Other vehicles, such as trailers, flatbed trucks, SUVs, ATVs, RVs, etc., can be substituted for the truck 100 in the example of FIG. 1A. The truck 100 includes a cabin 110 and a bed 120. The bed 120 is generally (but does not have to be) separated from (e.g., independent of) the cabin 110 to allow for chassis flex when carrying or pulling heavy loads. The cabin 110 is coupled with the bed 120. As used herein, the term "coupled with" may include a direct connection or indirect connection via one or more intermediary components. For example, the cabin 110 may be welded directly to the bed 120 or connected via a motor-vehicle chassis. The truck 100 may include additional, different, or fewer components.

The truck 100 shown in FIG. 1A is a pickup truck. As will be discussed in more detail below, a pickup truck includes side walls along the edge of the bed 120. However, in some embodiments, a collapsible storage container in accordance with an embodiment may be installed in or used with a vehicle that is pulling a trailer or even a semi-truck. For example, a collapsible storage container may be installed on a trailer that does not include as many (e.g., relative to a pickup) or any side walls along the edges of the floor of the trailer. In another example, a collapsible storage container may be installed in a semi-truck (e.g., near the rear doors, in a vertical plane on the back wall of the cabin, etc.). In another example, a collapsible storage container may be installed in a vertical plane along a back wall and/or side wall of an RV or the like.

The cabin 110 is an enclosed space where at least the driver is seated when driving the truck 100. The cabin 110 may be referred to as a "cab." The cabin 110 may be any now known or later developed cabin of a truck. For example, the cabin 110 may be a standard cabin, extended (or super) cabin, or crew cabin. A standard cabin has a single row of seats and a single set of doors, one on each side. Most pickups have a front bench seat that can be used by two or more people; however, various manufacturers have begun to offer individual seats with a console in the middle of the seats. An extended cabin includes additional space behind the main seating area. This additional space may be accessed by reclining the front bench forward or a rear access door on one or both sides of the cabin 110. A rear access door may be a door hinged on the trailing edge, which is the edge closer to the rear of the truck 100. One or more seats may be placed in the area behind the front bench. For example, in an embodiment, the cabin 110 may include a side-facing seat that can fold into the walls behind the front bench. However, in other embodiments, a full bench may be placed in the back. A crew cabin may be a cabin with four-doors. A crew cabin includes seating for up to five or six people on two full benches and full-size front-hinged doors on both sides. Most crew cab pickups have a shorter bed or box to reduce their overall length.

The bed 120 includes one or more side walls 122, a tailgate 124, and a floor 126. The side walls 122, tailgate 124, and floor 126 are configured to form an open-top cargo area 128. The open-top cargo area 128 may be used for carrying or hauling cargo, such as tools, gravel, groceries, clothes, or other items. Because the bed 120 is an open-top cargo area 128, the various items being carried or hauled are exposed to the weather and the possibility of theft. For some items, such as gravel and wood, weather and/or theft are generally not a problem. However, for other items, such as carpentry tools, groceries, and clothes, being exposed to the weather and theft are generally a concern.

In an embodiment, the bed 120 includes a collapsible storage container 130. As shown in FIG. 1A, the bed 120 includes a collapsible storage container 130 in an uncollapsed position. "Uncollapsed" or "erected" may include extended, elongated, enlarged, expanded, fanned out, heightened, increased, lengthened, let out, opened, prolonged, prolongated, raised, spun out, spread, spread out, stretched, unfolded, unrolled, widened, or otherwise moved from a collapsed position to an uncollapsed position. In the uncollapsed position, the collapsible storage container 130 is not collapsed. In the uncollapsed position, the storage container 130 may be enclosed and configured to store, haul, or carry cargo. In other words, the collapsible storage container 130 may be closed off on all sides. The inside or interior of the storage container 130 may be used as a cargo container to prevent cargo from sliding, being exposed to weather, and/or being stolen.

When in the uncollapsed position, the collapsible storage container 130 is in the bed 120 of the truck 100. The collapsible storage container 130 when uncollapsed may take up space of the bed 120 of the truck. For example, the collapsible storage container 130 when uncollapsed may take up more space of the bed 120 than the collapsible storage container 130 when collapsed. Relative to the collapsed position, the uncollapsed position may require more cubic footage of the bed 120.

In some embodiments, although one or more of the side walls of the collapsible storage container 130 may abut the bed 120 of the truck 100, the inside or interior of the storage container 130 (e.g., the area that stores, hauls, or carries cargo) is disposed in the open-top cargo area 128. For example, when uncollapsed, the inside or interior of the collapsible storage container 130 may be disposed between the side walls 122 and the tailgate 124, as well as being above the floor 126. The interior or inside of the collapsible storage container 130, when uncollapsed, is not inside the side walls of the bed 120 of the truck 100 or beneath the floor 126. For example, the collapsible storage container 130 is not a container inside of a compartment built in a side wall 122. Instead, the inside or interior of the collapsible storage container 130 may be disposed in the open-top cargo area 128. For example, the inside of the collapsible storage container 130 may be in the open-top cargo area when in the uncollapsed position. In the collapsed position, the collapsible storage container 130 may be unable to store, haul, or carry cargo.

The collapsible storage container 130, even in the uncollapsed position, is generally smaller than the bed 120 of the truck 100. For example, the bottom of the collapsible storage container 130, when in the uncollapsed position, may be less than half of the square footage of the bed 120 of the truck. In some embodiments, the bottom of the collapsible storage container 130, when in the uncollapsed position, may be less than a quarter of the square footage of the bed 120 of the truck. In some embodiments, the collapsible storage container 130 may be the same size or almost the same size as the bed 120 of the truck 100. The term "almost" accounts for the physical structure of the collapsible storage container 130.

In certain embodiments, the bottom panel of the container 130 can include one or more trusses 170, 171, 172, and/or 173 or other sliding supports attached to a bottom edges such that when the panels are in the fully erected position, the trusses 170, 171, 172, and/or 173 provide support. That is, side and front panels may not have an ability to provide support to the base when erected into an uncollapsed state, so the trusses 170, 171, 172, and/or 173 provide this support for them.

For example, in an embodiment, a front panel of the container 130 is housed beneath a base of the container 130 (but perhaps protected by a bottom sheet or panel underneath). By sliding the panel underneath the base, the container 130 can be placed and effectively used in a variety of positions in a vehicle bed, including at the edge of a truck or trailer tailgate. If the front panel of the container 130 is pulled out and "flipped up" or in the fully erected position, then the front panel is no longer able to provide support to the floor or base of the container 130 (e.g., whether an integrated bottom of the container 130 or part of an installed bed liner). One or more trusses 170, 171, 172, and/or 173 or movable supports are installed on the bottom of the front panel/door edge via hinges, allowing the trusses 170, 171, 172, and/or 173 to be pulled forward and provide support when the front panel cannot provide support due to its position. While the example of FIG. 1A shows the trusses extending along a length of the container 130, one or more trusses 170, 171, 172, and/or 173 can extend along a width of the container 130 instead. The number of trusses and/or other support(s) 170-173 may vary (e.g., a single truss, two trusses, three trusses, four trusses, five trusses, etc.). Trusses may be located to move along a direction of panel movement (e.g., a front panel slides underneath a floor or base panel of the container 130), normal to a direction of panel movement, diagonal to a direction of panel movement, etc.

Figure 1B:
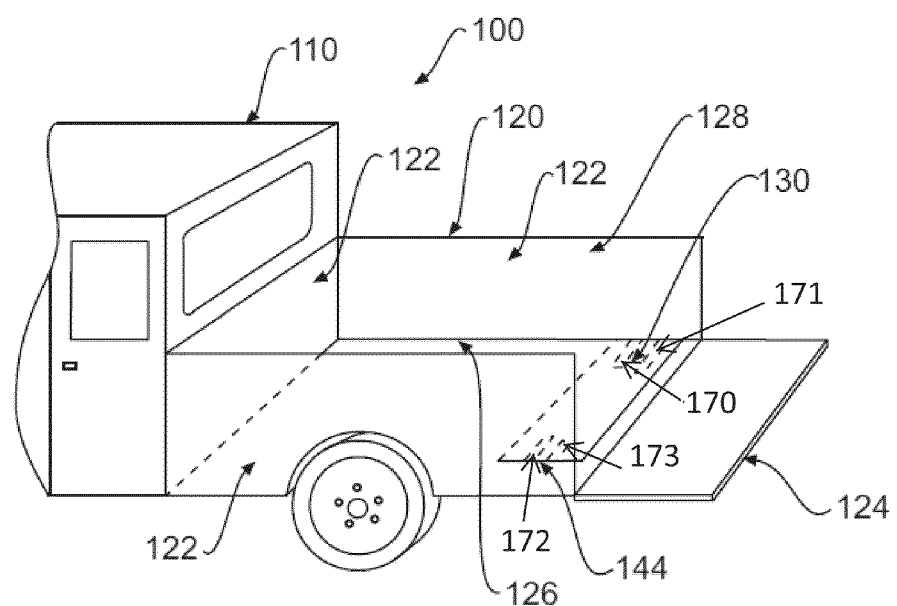

FIG. 1B illustrates the collapsible storage container 130 in a collapsed position. As used herein, "collapsed" may include caved in, folded, pivoted, broke down, reduced in size, or otherwise moved from an uncollapsed position to a collapsed position. As will be discussed in more detail below, "collapsible" includes foldable, pivotable, retractable, or otherwise movable into and out of a collapsed position and/or uncollapsed position. As such, the collapsible storage container 130 is a storage container that provides a user the opportunity to store, haul, or carry cargo in a storage container in the bed 120 of the truck 100 but then, when the bed 120 of the truck is desired, collapse the storage container such that the bed 120 of the truck 100 may be used as a bed 120 of the truck 100.

The collapsible storage container 130 is generally located, when in the uncollapsed position, near the tailgate 124. This location may allow a user to reach the collapsible storage container 130 without climbing into the bed 120 of the truck 100. However, the location of the collapsible storage container 130 is not limited, for example, as long as it is disposed in the bed 120 when in an uncollapsed position. For example, the collapsible storage container 130 may be disposed near the cab 110, as opposed to near the tailgate 124. In this example, a user may reach over a side wall 122 of the bed 120 or climb into the bed 120 to access the collapsible storage container 130. Other locations and ways of accessing the collapsible storage container 130 are included within the scope of this description.

For example, the collapsible storage container 130 may be oriented in a variety of ways in a truck bed or other vehicle platform. While many of the figures show the container 130 oriented with ends facing a side wall of a truck bed, the container 130 may be positioned such that the ends face the cab and tailgate of the truck. Other orientation or positioning is envisioned as well.

The collapsible storage container 130 may be made of one or more materials. For example, the collapsible storage container 130 may be made of plastic, metal (e.g., ferrous or non-ferrous such aluminum, steel, etc.), wood, or other material. The material may be weatherproof. For example, stainless steel or plastic may be used to protect against rain and snow. The material may also prevent or at least deter theft. For example, a hard plastic, such as TEFLON®, may be used to protect against both the weather and theft.

For example, the collapsible storage container 130 may be designed to fit in the back of a truck bed or other vehicle back/space. The sides and top and/or other panels/walls of the example collapsible storage container 130 can be made of a material such as an insulated High Density Polyethylene, Acrylonitrile Butadiene Styrene (ABS) plastic, polypropylene, etc., and hinges, locks, and brackets can be made from stainless steel, aluminum, etc. The example collapsible storage container 130 is engineered to be weather resistant and lockable and also secures cargo from rolling around in the bed of the truck or other vehicle/trailer. The example container 130 is fastened to the truck bed with four stainless steel bolts that, when retracted from the frame of the container 130, apply a strong sideways pressure to the wheel well area, securing the unit to the vehicle. In other examples, the container 130 may be held in place by the weight of the container 130 and friction between the container 130 bottom and the truck/vehicle bed. The container 130 may be built into a vehicle, sold as an accessory by an automotive dealer or manufacturer (e.g., as a bedliner, storage box, etc.), sold as an "after-market" item (e.g., a bedliner, storage box, etc.), etc.

In certain examples, the container 130 is provided as a part of and/or can be connected to a bedliner. For example, in an embodiment, a bedliner is configured to receive a collapsible storage container 130 for a bed of a truck and/or other vehicle, trailer, etc. A bedliner is a liner that covers a bed of a truck. The bedliner may protect a truck bed from damage and can prevent fine-grained cargo from moving around in the bed of the truck. When collapsed, the storage container 130 allows for all or substantially all of a bed of a truck to be used. However, when uncollapsed (and/or perhaps when partially uncollapsed), the storage container 130 may protect items placed in the interior of the storage container from the possibility of weather, theft, and sliding around the bed of the truck.

In an embodiment, a bedliner is configured to cover at least a floor of a bed of a truck and/or other vehicle and receive a collapsible storage container. The collapsible storage container is configured to move into and out of a collapsed position. The collapsible storage container may include a connection device that is configured to connect the collapsible storage container to the bedliner of a bed of a truck and/or other vehicle. The collapsible storage container includes an enclosed area, which is accessible, when the collapsible storage container is out of the collapsed position.

In another embodiment, a bedliner for a bed of a truck and/or other vehicle includes a floor covering, one or more side coverings, and a reception device. The floor covering is sized fit on a floor of a bed of a truck/vehicle. The one or more side coverings are sized to fit on one or more side walls of the bed of the truck/vehicle. The floor covering is coupled with the one or more side coverings such that the floor covering and one or more side covering cover the bed of the truck. The reception device is configured to receive a collapsible storage container. The collapsible storage container is a storage container that is configured to be moved into and out of a collapsed position. The collapsible storage container includes a connection device that is configured to connect to the reception device. The collapsible storage container includes an enclosed area that is located in an open-top cargo area of the bed of the truck when the storage container is moved out of the collapsed position.

In yet another embodiment, a method of manufacturing a bedliner includes forming a floor covering that is sized fit on a floor of a bed of a truck; forming one or more side coverings that are sized to fit on one or more side walls of the bed of the truck, wherein the floor covering is coupled with the one or more side coverings such that the floor covering and one or more side covering cover the bed of the truck; and forming a reception device that is configured to receive a collapsible storage container, wherein the collapsible storage container is a storage container that is configured to be moved into and out of a collapsed position, the collapsible storage container including an connection device that is configured to connect to the reception device, wherein the collapsible storage container includes an enclosed area that is located in an open-top cargo area of the bed of the truck when the storage container is moved out of the collapsed position.

The collapsible storage container 130 may include a security system (e.g., a lock, sensor, etc.). The security system may include an alarm system that alarms a user or others near the collapsible storage container 130 when the interior of collapsible storage container 130 is being accessed with authorization. For example, the collapsible storage container 130 may include an audio alarm that sounds an alarm if the collapsible storage container 130 is opened without disabling or disarming the alarm. The audio alarm may alert others in the nearby area that the collapsible storage container 130 is being opened. The alarm system may include a key pad or wireless remote system that allows the user to disarm the alarm system and access the collapsible storage container 130 without the alarm being triggered.

One or more of the side walls of the collapsible storage container 130 may be configured to provide access to the inside or interior of the collapsible storage container 130. For example, one of the side walls may fold down or up to allow access to the inside of the storage container when in an uncollapsed position. In other embodiments, instead of moving the entire side wall, a door or window may be provided to the inside of the collapsible storage container 130. In some embodiments, both a side wall that provides access (e.g., folds up) and a door may be provided. When something large is to be retrieved from or placed in the inside of the collapsible storage container, one or more side walls may be folded down or up, for example. However, a door or window may also be provided to allow the user to retrieve or place something small on the inside of the collapsible storage container. When access is not needed, the one or more sides may be configured to prevent access to the inside.

When in the collapsed position, the collapsible storage container 130 takes up little (if any) of the open-top cargo area 128. The collapsible storage container 130 may be unable to store, carry, or haul cargo when in the collapsed position. When the storage container 130 in an uncollapsed position, the storage container 130 provides a storage container that may be used to store, carry and haul cargo. The collapsible storage container 130, when uncollapsed, may be weatherproof and/or secure from theft, such that the cargo inside the collapsible storage container 130 is protected from the weather and theft. Weatherproof may include protection against rain, snow, wind, or other weather. Secure from theft may include protection against theft. For example, the collapsible storage container 130 may deter or slow down a theft (e.g., relative to not having a collapsible storage container 130).

The collapsible storage container 130 may be manually and/or electrically moved from a collapsed position to an uncollapsed position. For example, a user may manually move the collapsible storage container 130 between the collapsed and uncollapsed positions. The collapsible storage container 130 may include one or more handles that are used for assisting with converting between the collapsed and uncollapsed positions. In another example, the collapsible storage container may be automatically (e.g., with zero or little assistance from a user) moved. The collapsible storage container 130 may be connected to an electrical system that automatically moves the collapsible storage container 130. A user may initiate movement (e.g., by pressing or pressing and holding a button) between the movements. The electrical system then drives the collapsible storage container 130 between the positions.

The collapsible storage container 130 may include one or more compartments or sections. The interior of the collapsible storage container 130 may include a compartment system that allows a user to compartmentalize the inside or interior of the collapsible storage container 130. For example, the inside or interior may include two compartments. One compartment may be a smaller compartment that is used to carry items that are likely to move around, such as groceries. Another compartment may be larger (e.g., relative to the smaller compartment) and used to carry larger items, such as tools, computers, etc.

The collapsible storage container 130 may include one or more dividers made of plastic or some other rigid material to be installed into the base of the container 130. For example, one or more dividers may be integrated as part of the container 130 or one or more dividers that form part of an installed bed liner that can be "flipped up" to a position perpendicular to the base of the container 130. The flip-up divider(s) may help prevent items in the fully erected container 130 from rolling from side to side as easily as the items might if the dividers were not employed. When the divider(s) are not desired or when the container 130 is in its fully collapsed position the divider(s) are "flipped down" and lie virtually flush with the top of the base, for example.

The collapsible storage container 130 may include a non-skid bottom, non-ski pad(s), etc. For example, the bottom of the container 130 (e.g., either a bottom that is integrated with a base panel as part of the container 130 or a bottom that is part of an installed bed liner, etc.) may be made up of a "non-skid"-type surface. The bottom may be made to be non-skid through material used in the manufacture of the bottom portion itself or by applying a material after manufacture of the bottom to make the bottom skid resistant, for example.

Thus, the container 130 can utilize an attachment system that is non-invasive. That is, a weight of the container 130 itself is sufficient to hold the container 130 in position in the vehicle without having to attach the container 130 to the vehicle by screws, latches, ties, etc. In certain examples, an additional ballast on the bottom of the container 130 can help to secure a position of the container 130.

The collapsible storage container 130 may include one or more attachments or accessories. For example, the collapsible storage container 130 may include a cargo light. The cargo light can be installed on or in one or more sides of the container 130 (e.g., top, back, and/or two sides of the collapsible storage container 130). In its collapsed state, for example, all four "undersides" of the top, back, and side panels of the container 130 are protected due to the way the panels collapse inward or on each other. The cargo light may be an incandescent light, light emitting diode (LED), or the like, and can be powered by a battery situated next to the light, directly from an existing vehicle battery, etc.

The collapsible storage container 130 may include a drain plug or stopper to allow the container 130 to retain and release fluid. For example, a drain plug or other closable opening may be installed in a bottom of the container 130 and/or bedliner. For example, if water (e.g., from rain, melting ice, etc.) or other liquid has collected in the container 130, the plug may be opened to allow the liquid to drain from the container 130.

The collapsible storage container 130 may include handles. For example, one or more handles or other grips may be positioned on or in the outside of the container such that once the container 130 is "un-hooked" or otherwise detached (e.g., from a truck bed or other vehicle, a base or receptacle on a truck bed or other vehicle, bedliner, etc.), the container 130 can be lifted and repositioned.

The collapsible storage container 130 may be insulated. For example, the walls of the container 130 may be constructed from an insulating material. Alternatively or in addition, insulation may be installed in the side(s), front, top, and/or back panels. For example, one or more panels may be insulated with material to delay effects of heat and/or cold transfer from inside the container 130 to outside and/or outside the container 130 to the inside.

The collapsible storage container 130 may include removable straps or netting inside the container 130. For example, straps, netting, and/or other support may be attached to one or more panels of the container 130 (e.g., attached to either of the two sides, top, back or front) such that it spans between two opposing panels to hold stationary items that may otherwise roll or shift in the container 130. The straps, netting, etc., may be removable such that they are installed at times and uninstalled and stored at other times.

The collapsible storage container 130 may include one or more indentations in a panel (e.g., a top or front panel, etc.) whereby a beverage container, such as a cup, bottle, can, etc., can be placed in an indentation. A beverage container placed in an indentation may be prevented from moving on the top of the container 130, for example, as easily as the beverage might without the recess.

It is noted that, in certain embodiments, there may be one or more intermediary positions between a completely collapsed position (i.e., unable to store, carry, or haul any cargo) and a completely uncollapsed position. That is, the container 130 can be not completely erected or uncollapsed and also not completely collapsed. For example, the collapsible storage container 130 may be partially collapsed (also referred to as partially uncollapsed, depending upon viewpoint) and able to store, carry, or haul some cargo. For example, one or more walls or panels of the container 130 can be moved into a position between its collapsed and fully uncollapsed positions, thereby allowing one or more articles to be at least partially contained within the storage container 130 while the container 130 is in a "semi-collapsed" or "partially collapsed" state. In some examples, an amount of cargo that the container 130 is able to hold in a partially collapsed state is less than an amount of cargo that the container 130 is able to hold in an uncollapsed or erected state. In a partially collapsed position, the collapsible storage container 130 is unable to store, carry, or haul as much cargo as when in the completely uncollapsed position but is still able to store, carry, or haul some cargo. However, because the collapsible storage container 130 is partially collapsed, the storage container 130 does not require as much cubic footage of the bed 120 as the storage container 130 in a completely uncollapsed position.

The collapsible storage container 130 includes an attachment system 144. The attachment system 144 may be used to connect or attach the collapsible storage container 130 to the bed 120 of the truck 100. The attachment system 144 may include screws, hooks, rods, snap-in modules, or other mechanisms for securing or fixing the storage container 130 to the bed 120 of the truck 100. In some embodiments, as will be discussed in more detail below, the attachment system 144 may be distributed between the collapsible storage container 130 and the bed 120 (or other component, such as a bed liner, that attaches to the bed 120). For example, the collapsible storage container 130 may include a male component that connects (e.g., snaps, screws, or otherwise attaches) into a female component of the bed 120 or vice-versa.

The collapsible storage container 130 may include a support system. The support system may be used to support the collapsible storage container 130 in an uncollapsed position. The support system may be rigid side walls (e.g., as shown in FIG. 1A), a hook system, a telescoping rod system, or other system that is able to hold or maintain the collapsible storage container 130 in an uncollapsed position.

For example, as shown in FIG. 1A, in some embodiments, the side walls of the collapsible storage container 130 are able to support themselves in the uncollapsed position. The side walls of the collapsible storage container 130 may be rigid and able to remain in an uncollapsed position. However, in other embodiments, the collapsible storage container 130 may need additional support.

In an embodiment, a rod and/or hook and latch system may be used to support one or more panels of the collapsible storage container 130. Hooks may be tapered and/or untapered latch hooks, for example. For example, two hooks may be located on the outside of each side panel with two hooks located on the inside of each side panel that are tapered from a "pointed end" to a thicker or more robust middle and base. As a latch is turned into the receiving hook, the taper forces a tighter and tighter fit between the two panels. The tighter fit allows the container 130 to be weather tight when the latches (e.g., all six latches) are fully turned, for example.

In an embodiment, side panels may include tongue and groove sides. For example, side panels may include a tongue molded into an edge that lodges into a groove of a corresponding top, back, or front panel when the container 130 is fully erected. Using this design, potential incoming moisture is forced through a tortuous path up, over and around this tongue prior to being able to enter the cavity created by the fully erected (uncollapsed) collapsible storage container. The tongue may be constructed from a solid material, a flexible and/or crushable material (such as a semi-hard plastic or rubber), etc.

Foldable Storage Container Example(s)

Figure 1C:
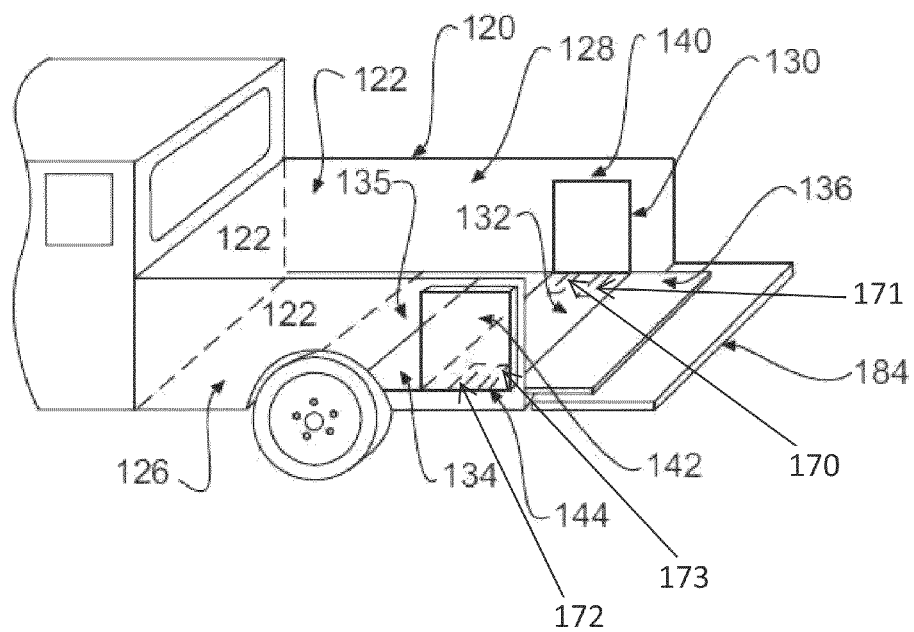
Figure 1D:
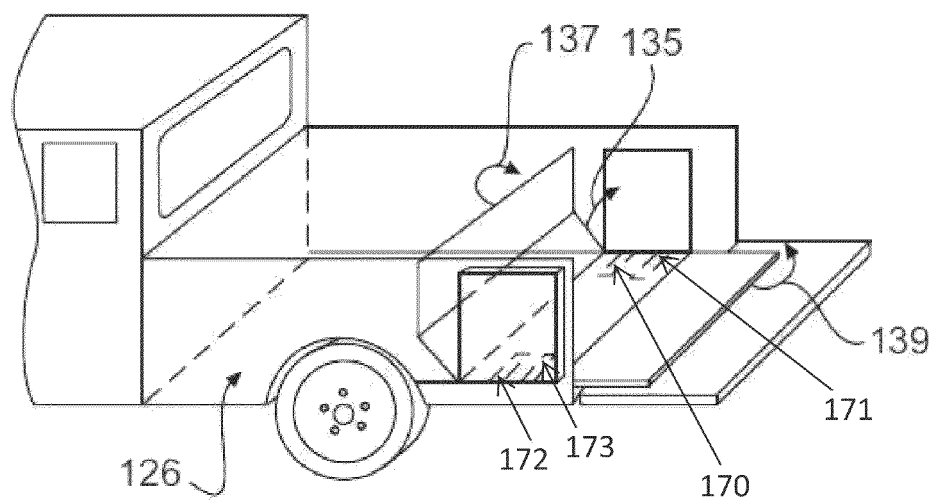

FIGS. 1C-1D illustrate additional views of a collapsible storage container 130 that is foldable. The collapsible storage container 130 may be folded from a collapsed position into an uncollapsed position. Likewise, the collapsible storage container 130 may be unfolded from the uncollapsed position into a collapsed position.

As shown in FIG. 1C, the collapsible storage container 130 includes a bottom side panel 132, a front side panel 134, a back side panel 136, a top side panel 138, a left side panel 140, and a right side panel 142. It is noted that the descriptions "bottom," "front," "back," "top," "left," and "right" are from the perspective of facing the front of the truck 100. (e.g., as used herein, the "front" is toward the cabin 110, the "bottom" is toward the ground, the "right" is toward the driver side of the truck in the United States). However, other descriptions may be used, for example, in the event that the collapsible storage unit 130 or truck 100 is rotated. The descriptions are intended to help illustrate the concepts and not limit the mechanics, structure, or various embodiments. A panel may be referred to as a wall or side of the collapsible storage container 130.

FIG. 1C illustrates the collapsible storage container 130 in a collapsed position. In the collapsed position, the collapsible storage container 130 provides use of all or substantially all of the open-top cargo area 128, which is the area between the side walls 122, tailgate 124, and floor 126. For example, in some embodiments, as shown in FIG. 1C, four of the panels 132-138 of the collapsible storage container 130 lay flat on the floor 126 (and/or tailgate) of the bed 120, while two of the panels 140, 142 are positioned against or adjacent to the sides 122 of the bed 120. Substantially the entire bed 120 may be used for carrying and hauling. As used at least in this example, "substantially" relates to the space taken up by the side walls of the collapsible storage container 120 when lying on top of or adjacent to the side walls 122, tailgate 124, and/or floor 126. For example, the term "substantially" takes into account the physical structure of the collapsible storage container 130. In another example, one or more of the side walls 122, tailgate 124, and floor 126 include (e.g., are manufactured with) an indentation that allows the side panels of the collapsible storage container 130 to be flush with the remaining portion of the sides 122, tailgate 124, and/or floor 126. The indentations allow for the entire bed 120 to be used for carrying and hauling, since the side walls of the collapsible storage container 130 are moved into the indentations when in a collapsed position. The indentation may take into account the physical structure of the collapsible storage container 130. For example, if one or more of the panels are an inch thick, then the indentation may be an inch deep to allow the one or more panels to lay in the indentation.

FIG. 1D illustrates the collapsible storage container 130 being folded from a collapsed position into an uncollapsed position. As shown by arrow 135, the front side panel 134 may fold toward the left and right side panels 140, 142. As shown by arrow 139, the back side panel 136 may fold toward the left and right sides 140, 142. In other words, the front side panel 134 and back side wall 136 may fold toward each other and connect with the left and right side panels 140, 142 to form an open-top storage container. However, as shown by arrow 137, as the front side wall 134 is folded up, the top side wall 138 may fold onto, along, or adjacent to the top of the left and right side walls 140, 142 to provide the top to the collapsible storage container 130. When folded together and connected, the side walls 132-142 form an enclosed area that may be used for storage, for example, while driving or parked.

As shown in the examples of FIGS. 1C and 1D, one or more trusses and/or other sliding supports 170-173 can be provided underneath the base 132 of the container 130 to provide support for the container 130 as one or more panels 134, 136, 140, 142 are moved. For example, side walls 140, 142 can slide under the base or bottom panel 132. In this example, the front panel 134 folds forward, and the sides 140, 142 slide under the base 132. In an embodiment, the sides 140, 142 and the front 134 have trusses 170, 171, 172, and/or 173 or other sliding supports attached to their bottom edges such that when the panels are in the fully erected position, the trusses 170, 171, 172, and/or 173 provide support. That is, side and front panels may not have an ability to provide support to the base when erected into an uncollapsed state, so the trusses 170, 171, 172, and/or 173 provide/replace this support for them.

For example, in an embodiment, a front panel, side panel, back panel, and/or other panel of the container 130 is housed beneath a base of the container 130 (but perhaps protected by a bottom sheet or panel underneath). In certain examples, the trusses 170, 171, 172, and/or 173 extend underneath the base in the direction of movement as the panel is moved and provide/replace this support that had been provided by the panel when slid or otherwise positioned underneath the base. By sliding the panel underneath the base, the container 130 can be placed and effectively used in a variety of positions in a vehicle bed, including at the edge of a truck or trailer tailgate.

In an embodiment, if the front door of the container 130 is pulled out and "flipped up" or in the fully erected position, then support that the front door provided to the floor of the container (e.g., whether an integrated bottom of the container 130 or part of an installed bed liner) is no longer provided. One or more trusses 170, 171, 172, and/or 173 or movable supports are installed on the bottom of the front panel edge via hinges, allowing the trusses 170, 171, 172, and/or 173 to be pulled forward and provide support when the front panel cannot due to its position. Thus, one or more movable side panels and/or front panel can be supported by one or more trusses 170-173 in collapsed and/or uncollapsed position.

All or some of the walls 132-142 may stay connected using connection system. The connection system may include magnets, snaps, screws, hinges, or other connectors that connect all or some of the panels 132-142 together. For example, in an embodiment, an inter-lock mounting system may be used. In this example, the front side wall 134 may include a male snap-in mount that inter-locks with a female snap-in mount on the left and right side walls 140, 142. The other side walls may also include other similar inter-locking connectors. In an embodiment, the connection system may allow some, but not all, of the panels 132-142, to move. This may be advantageous when the collapsible storage container is uncollapsed. For example, the connection system may allow the top panel 138 to move while the other panels 132-136 and 140-142 to remain connected. This will allow a user to access the inside or interior of the collapsible storage container 130, for example, when uncollapsed.

In some embodiments, the left and right side panels 140, 142 may also lay flat on the floor 126 when collapsed. This may reduce the interior size of the collapsible storage container 130 but may also reduce the complexity of the design of the collapsible storage container 130.

Figure 1E:
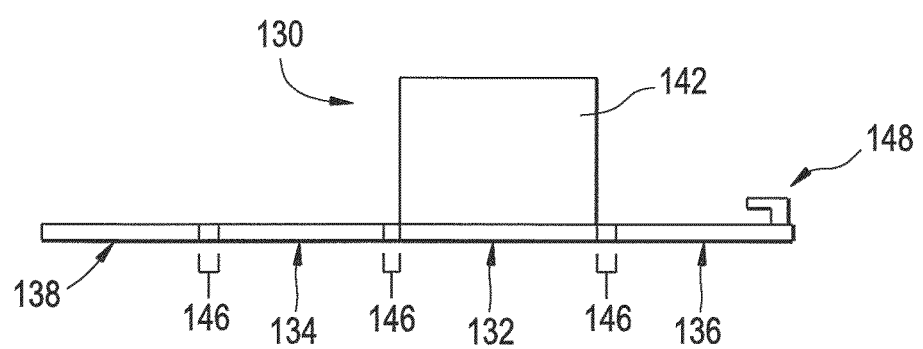

FIG. 1E illustrates a side perspective of the collapsible storage container 130 of FIGS. 1C-1D. As shown in FIG. 1E, in addition to the side panels 132-142, the collapsible storage container 130 includes hinges 146 that couple at least some of the side panels 132-142 with each other. The hinges 146 may be rubber hinges, living hinges, or other hinges that are weatherproof (e.g., able to prevent or deter water or other liquid from entering into the inside of the collapsible storage container 130). The hinges 146 may allow the sides to collapse. For example, in the embodiment shown in FIG. 1E, the hinges 146 allow all or some of the panels 132-142 to fold away from each other when the collapsible storage container 130 is collapsed and fold toward each other (e.g., to form an enclosed storage container) when uncollapsed.

The collapsible storage container 130 may include a lock 148. The lock 148 may be a locking system (e.g., including one or more locks) that secures the collapsible storage container 130 when uncollapsed. The lock 148 may prevent one, some, or all of the walls from moving and providing access to the interior of the collapsible storage container 130. In some embodiments, the lock 148 may include a lock and key system on an edge of a first panel and an edge of a second panel. A user may insert a key into the locking mechanism to lock the collapsible storage container 130. The locking mechanism, when the collapsible storage container 130 is collapsed, may not extend out of the sides and snag objects being placed into the bed 120 of the truck 100.

In certain examples, an attachment system may be an invasive or non-invasive attachment system. An invasive attachment system is an attachment system that enters into the bed of the truck (e.g., is screwed into the bed of the truck). However, a non-invasive attachment system is an attachment system that attaches to the bed of the truck without entry into the truck.

Figure 2A:
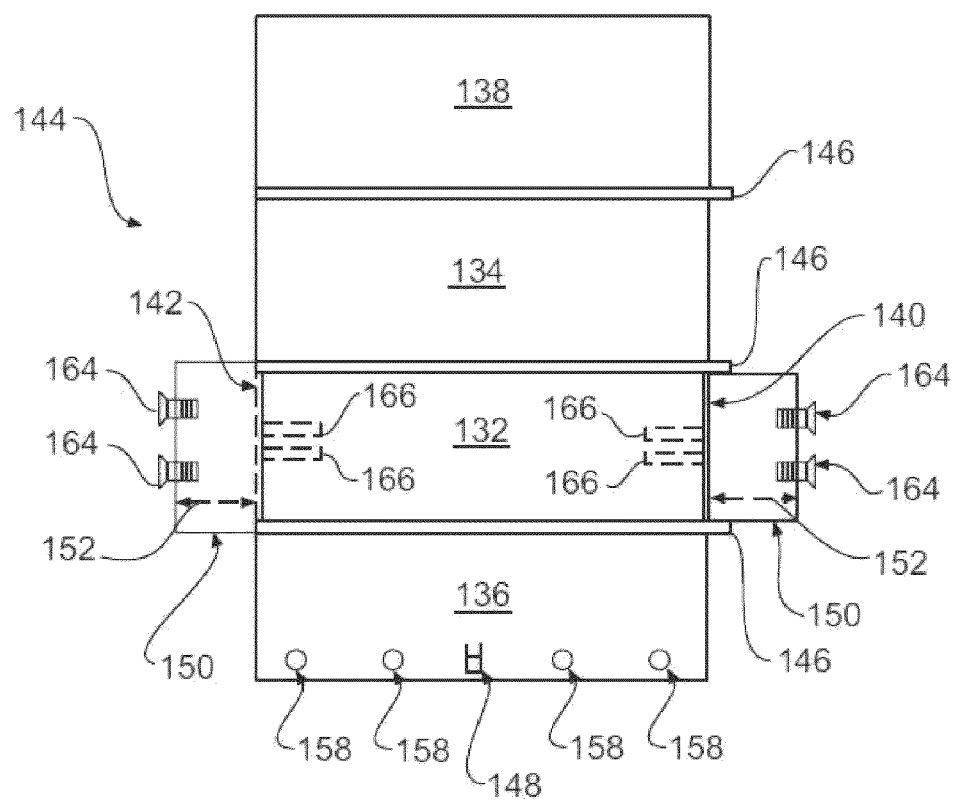
FIGS. 2A-3 illustrate examples of a collapsible storage container with an attachment system.

FIG. 2A illustrates an example embodiment of a collapsible storage container 130 in a collapsed position (e.g., laying flat). The collapsible storage container 130 may include an attachment system 144. As mentioned above, the attachment system 144 may be used to attach the collapsible storage container 130 to a bed of the truck. For example, the attachment system 144 may be used to hold, set, put, or place the collapsible storage container in a rigid, permanent, non-movable, or secure position. The attachment system 144 may prevent someone from easily removing the collapsible storage container 130 from the bed of the truck.

FIG. 2A illustrates an example of an embodiment of an attachment system 144. The attachment system 144 is a non-invasive attachment system. The attachment system 168 includes an attachment plate 150, pressure bolts 164, a rod and shaft system 166, and a gusset 160. Additional, different, or fewer components may be provided. The collapsible storage container 130 may include or be configured to connect to an attachment system 150. The attachment system 144 attaches, secures or fixes the collapsible storage container 130 to the bed 120. The attachment system 144 may be attached to both the collapsible storage container 130 and the bed 120.

As shown in FIG. 2A, the attachment plate 150 can be secured to the bottom side panel 132. Securing the attachment plate 150 to the bottom side panel 132 may include screwing, nailing, gluing, hinging, clamping, manufacturing as a single piece, or otherwise attaching the two together. The pressure bolts 164 may be backed out of the attachment plate 150 up against the side walls 122 of the bed of the truck to secure the attachment plate 150 to the bed of the truck. The pressure bolts 164 may include holes that allow a lock (e.g., a pad lock) to be placed through the bolt 164 to prevent it from being loosened. Once the screws are tight against the bed of the truck, the attachment plate should not be able to be removed or move around.

Figure 2B:
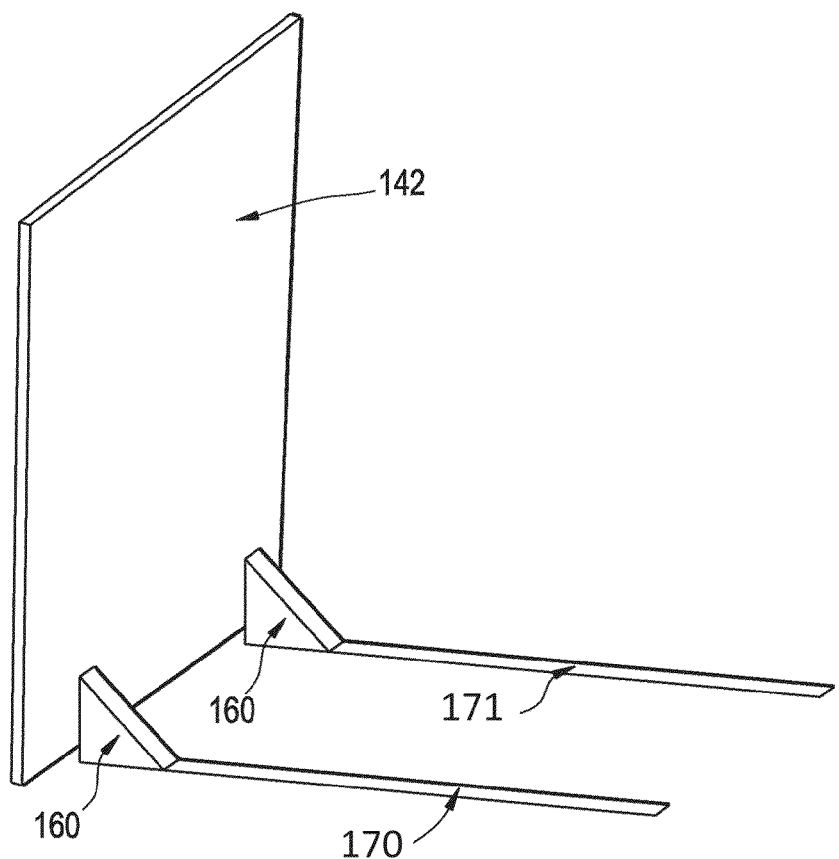
Figure 3:
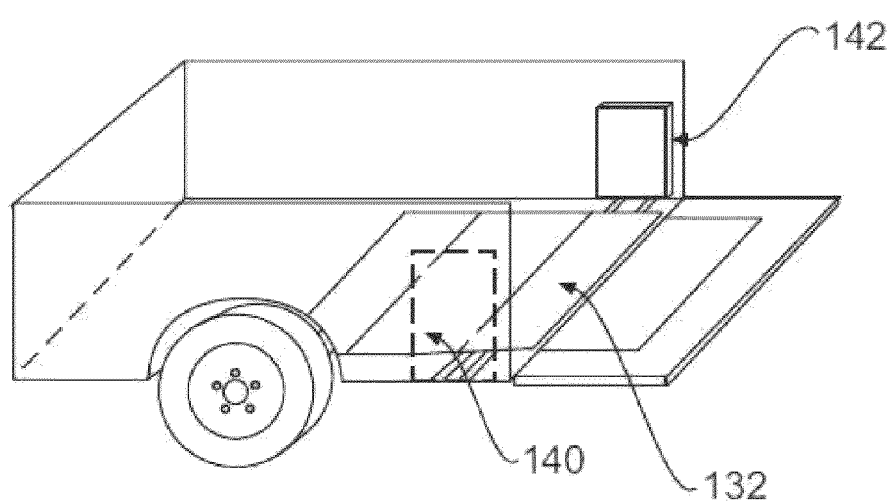

As shown in the embodiments of FIGS. 2A-3, the attachment system 144 may include one or more rods 170-171 and associated shaft 166. The rod(s) 170-171 may extend into the shaft 166. The shaft 166 may be a hole or tunnel that extends into the bottom panel 132.

As shown in FIG. 2A, the bottom panel 132 may include one or more shafts 166. The shafts 166 are sized to receive a rod 170, 171 (shown in FIG. 2B) that is connected to the side panel 142. The rod 162 guides the side panel 142 as shown by arrow 152. FIG. 2B illustrates a side panel 142 and the rod 162. A gusset 160 may be used to further support the connection between the rod 162 and side panel 142.

As shown in FIG. 3, rod and shaft and/or other support allow the side panels 140, 142 to slide or otherwise move adjacent to the side walls 122 of the bed of the truck so that as much of the bed of the truck may be used as possible. When in a collapsed position, the side walls 140, 142 may be moved away from the bottom panel 132 and toward the edges of the bed of the truck. When in a fully erected position, the glide bars can provide support to the container at the base 132.

In some embodiments, the attachment system 150 may allow all, some, or one of the side panel 132-142 to move. For example, as shown in FIG. 3, the attachment system 150 may include one or more tracks, rods and shafts, or other connectors that allow for movement. FIG. 3 illustrates an embodiment where the side panels 140, 142 are extended away from the bottom panel 132 and toward the side walls of the bed of the truck.

It should be noted that instead of using a rod and shaft system as described above, the attachment system 144 may include a track system or telescoping system to provide for the movement of all, some, or one of the panels, for example. However, in other embodiments, the attachment system 144 does not allow for movement of any of the panels. Instead, with exception of the folding movement, the panels of the collapsible storage container 130 are not movable. For example, the left and right side walls 140, 142 may not move as shown by arrow 152 of FIG. 2A.

FIGS. 4A-4D illustrate an embodiment of a collapsible storage container 130. The embodiment(s) shown in FIGS. 4A-4D is/are similar, with respect to folding, to the embodiment(s) shown in FIGS. 1C-1D, except that the side panels 140, 142 also fold down. In other words, all of the side walls 132-142, including the side panels 140, 142 fold down into a collapsed position, as will be described and illustrated in more detail below.

Figure 4A:
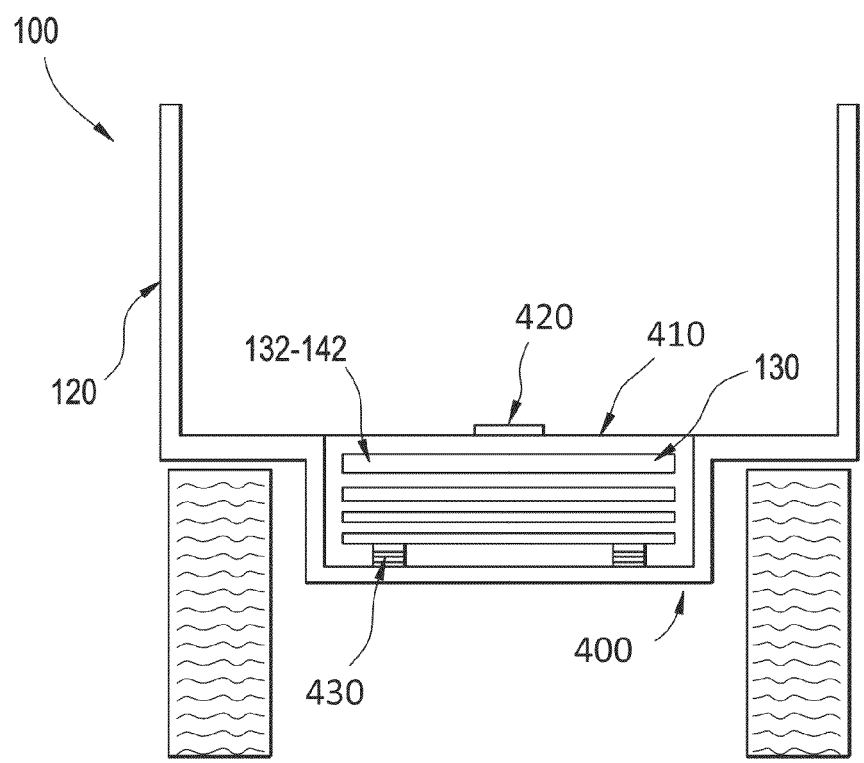
FIGS. 4A-4D illustrate examples of a collapsible storage container.

FIG. 4A illustrates a rear-view of a collapsible storage container 130 in the bed 120 of a truck 100. The bed 120 includes a stow-away compartment or indentation 400. The stow-away compartment 400 may be built into (e.g., integrated) into the bed 120, for example, during manufacture of the bed 120. The compartment 400 may allow the collapsible storage container 130, when in a collapsed position, to be out of the way of the bed 120, such that the entire bed 120 may be used to haul, carry, or store cargo.

In some embodiments, the compartment 400 includes a door 410 with a handle 420. The handle 420 may be used to open the door 410. The handle 420 may be configured to allow a user to lift the door, for example, when the door 410 is closed using gravity or a light attaching mechanism, such as magnets or snaps. However, in other embodiments, the handle 420 is connected to a latch (e.g., including a lock) that latches the door 410. The handle 420 may be used to open the latch that is securing the door 410 shut.

The door 410 may be opened and shut. When the door 410 is opened, the collapsible storage container 130, which is collapsed when in the compartment 400, may be moved into an uncollapsed position. For example, in some embodiments, the door 410 may be opened and the collapsible storage container 130 removed from the compartment 400. The collapsible storage container 130, in the collapsed position, may attach to a guide, rail, spring, pivot, or other mechanism that allows the collapsible storage container 130 to be removed from the stow-away compartment 400. In some embodiments, once the collapsible storage container 130 is removed, the door 410 is closed. However, in other embodiments, the door 410 does not need to be closed. Instead, the door 410 needs to allow the collapsible storage container 130 to be moved into an uncollapsed position. For example, the door 410 may be on a hinge that moves the door 810 out of the way or the door 410 may slide out of the way.

Figure 4B:
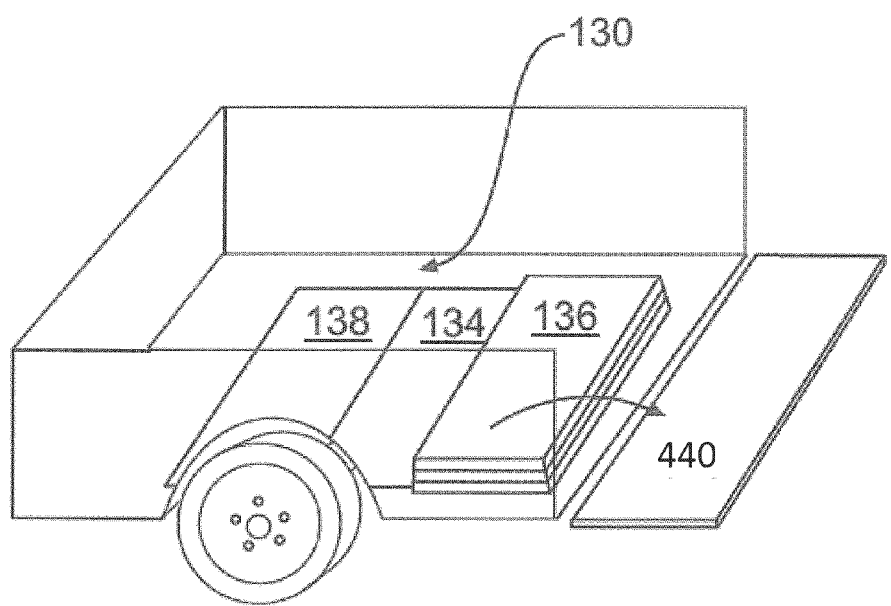
Figure 4C:
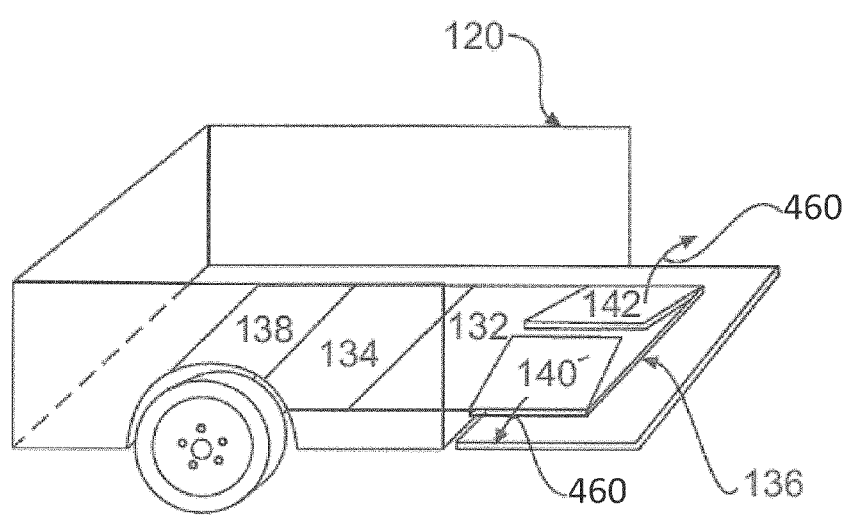

As shown in FIG. 4B, once the collapsible storage container 130 is removed from the stow-away compartment or other indentation 400, the panels 132-142 may be unfolded as shown in FIGS. 4B and 4C. The folding may be similar, but not necessarily the same, as the folding of FIG. 1D. For example, as shown in FIG. 4B, the front and top panels 134, 138 may be folded toward the front of the truck 100. The back and side panels 136, 140, 142 may be folded toward the back of the truck 100 (e.g., the tailgate), as shown by arrow 440. As shown in FIG. 4C, the side panels 140, 142, which are connected to the back panel 136 in this example, may be folded toward the sides of the bed 120, as shown by arrows 460.

Figure 4D:
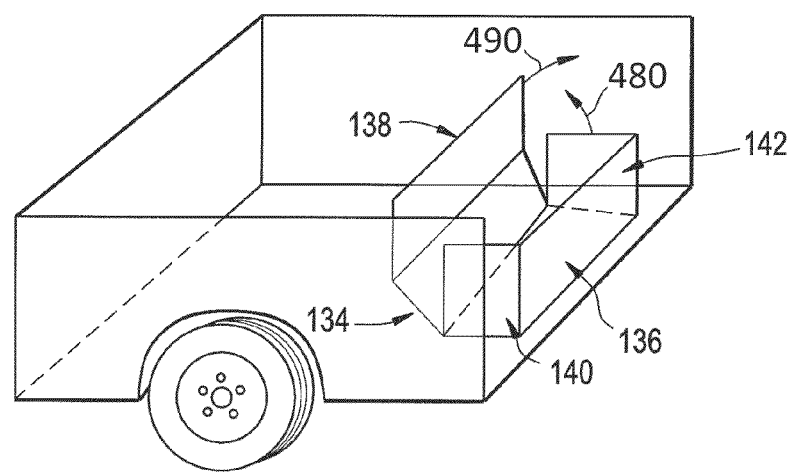

As shown in FIG. 4D, the back panel 136 and side panels 140, 142 may be folded toward the front of the truck 100, as shown by arrow 480. In FIG. 4D, the back panel 136 and side panels 140, 142 have already been folded. The arrow 480 shows the folding motion that already occurred. The front panel 134 and top panel 138 may be folded backwards, as shown by arrow 490. The various panels may then be connected together. Once connected together, for example, using a connection system, the collapsible storage container 130 is in the uncollapsed position. When the collapsible storage container 130 is moved back into the collapsed position, the user may unconnect the panels 132-142 and move the collapsible storage container 130 back into the stow-away compartment 400 of FIG. 4A. The door 410 may then be shut.

It should be noted that the method of folding and unfolding described herein are examples. Depending on how the collapsible storage container 130 is configured, the folding and unfolding may occur differently. For example, in FIG. 4C, the side walls 140, 142 may be connected to the bottom panel 132, front panel 134, or the top panel 138. This may change the way that the collapsible storage container 130 is collapsed and uncollapsed (e.g., folded and unfolded).

For example, top panel 138 and back panel 136 may fold in on themselves such that the panels collapse on top of each other, with the back panel 136 on bottom and the top panel 138 remaining on top.

In another example, one or more front, back and/or side panels can be configured to slide under the base or bottom panel 132 of the container 130. In this example, the panel 134 folds forward, and the sides 140, 142 slide under the base 132. In an embodiment, one or more of the panels 134, 136, 140, 142 have trusses 170, 171, 172, and/or 173 or other sliding supports attached to their bottom edges such that when the panels are in the fully erected position and/or are being moved into and/or out of the fully erected position, the trusses 170, 171, 172, and/or 173 provide support. That is, one or more of the side, back, and front panels 134, 136, 140, 142 may not have an ability to provide support to the base 132 when erected into an uncollapsed state, so the trusses 170, 171, 172, and/or 173 provide this support instead.

In an example, the collapsible storage container 130 may include a front door or panel that slides underneath the base, which may be integrated into the container 130 as part of the container unit, as part of a bed liner already installed on top of a truck bed, or the like.

In an embodiment, if a panel 134, 136 (e.g., a front and/or back panel) of the container 130 is pulled out and "flipped up" or in the fully erected position, then support that the panel had been providing to the floor of the container 130 (e.g., whether an integrated bottom of the container 130 or part of an installed bed liner) is no longer provided. One or more trusses or movable supports 170, 171, 172, and/or 173 are installed on the bottom of the panel edge via hinges, allowing the trusses 170, 171, 172, and/or 173 to be pulled forward and provide continued support to the base 132 when the panel 134, 136, 140, and/or 142 cannot due to its position.

In certain examples, each truss 170, 171, 172, and/or 173, has a front portion and a side portion. The front portion of the truss is smaller than the side portion of the truss (e.g., has a lesser or narrower dimension). The front of each truss is attached to a bottom of a container wall or panel, wherein the side of each truss is to be oriented along a direction of movement of the associated panel to allow the plurality of trusses to be pulled forward with the attached panel and to provide support to the base 132. Thus, in certain examples, a plurality of trusses is attached to a front panel of the collapsible storage container 130 to provide support to a base 132 of the container 130 when the container 130 is in the uncollapsed position. In certain examples, however, a truss can be oriented perpendicular and/or at another angle with respect to the direction of movement of the panel or panels to which the truss is attached.

In some embodiments, the bottom of the compartment 400 may be the bottom of the inside or interior of the collapsible storage container 130. For example, the bottom panel 132 may not be needed. Instead, the other panels may form a container around the compartment 400. This may expand the size of the interior of the collapsible storage container 130. However, when uncollapsed, the inside or interior of the collapsible storage container 130 extends above the floor 126 and into the open-top cargo area.

The compartment 400 may be used for various embodiments of the collapsible storage container 130. For example, a collapsible storage container 130 with bellows may be placed in the stow-away compartment. In another example, a collapsible storage container 130 with one or more telescoping rods may be stored in the compartment 400. The telescoping rods may extend out of the stow-away compartment, for example. In yet another example, a collapsible storage container 130 that is pivotable or retractable may be stored in the stow-away compartment.

Bed-Liner Storage Container(s)

A collapsible storage container may be connected to a bed liner. A truck bed liner is a covering that may protect a truck bed from damage and can prevent fine-grained cargo from moving around in the bed of the truck. A bed liner may be a drop-in bed liner. A bed liner is installed in the bed of the truck, for example, by snapping, screwing, or otherwise connecting the bed liner to the bed of the truck. A bed liner may be made of, for example, plastic, rubber, or other material. A bed liner may be made in a single piece (e.g., that is fitted to the bottom and sides of the bed of the truck) or separate pieces (e.g., that are installed individually on the bottom and sides of the bed of the truck). In some embodiments, a bed liner may be removable.

Figure 5A:
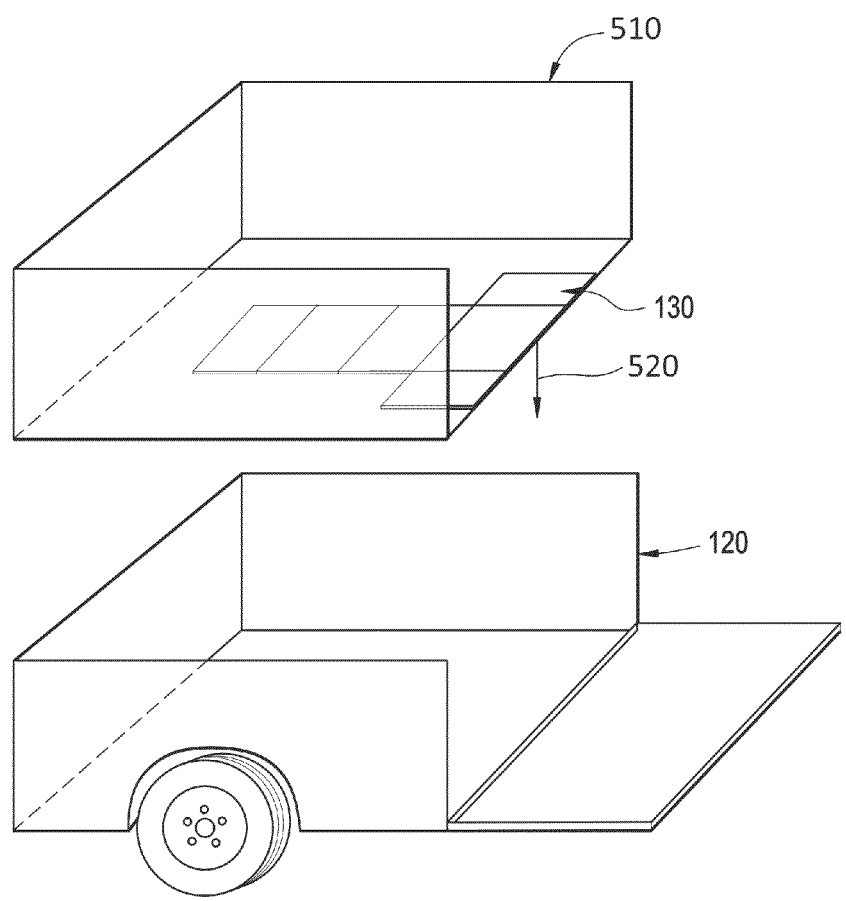
FIGS. 5A-5E illustrate examples of a collapsible storage container in a bedliner.
Figure 5B:
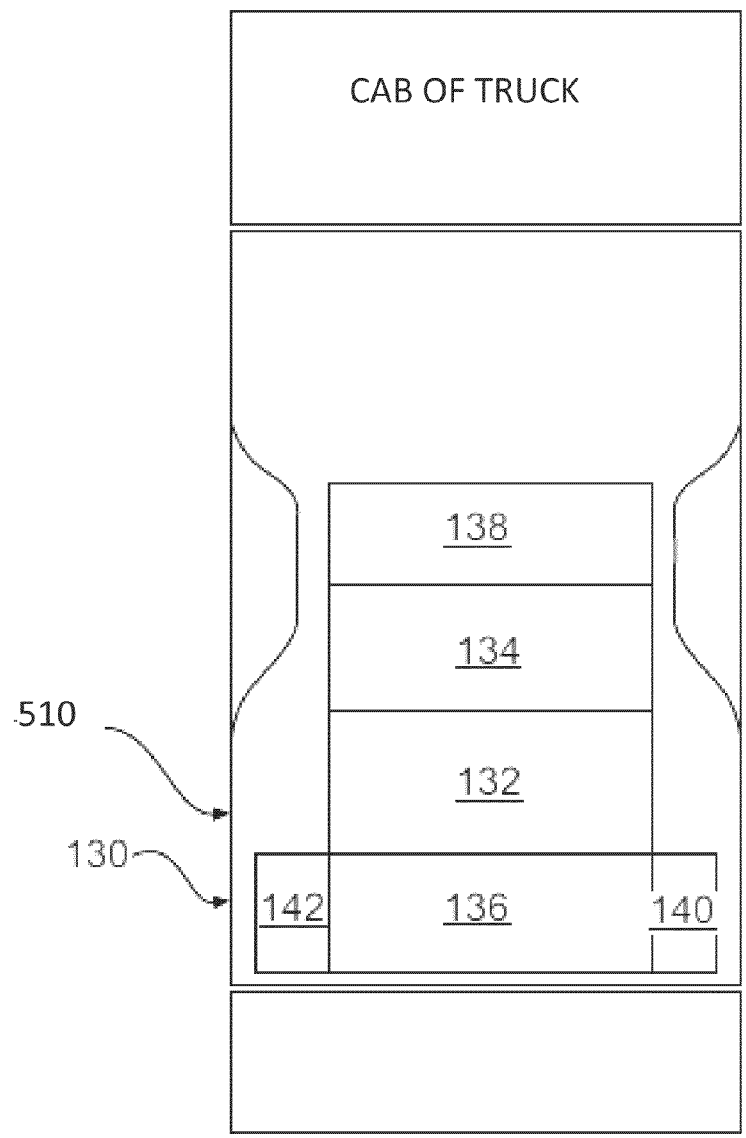

In some embodiments, as shown in FIGS. 5A-5B, a collapsible storage container 130 is embedded in a bed liner 510. Embedded may include manufactured with (e.g., as a single piece), integrated with, built into, or otherwise formed with the bed liner 510. For example, during manufacture of a bed liner, one, some, or all of the panels of a collapsible storage container may be manufactured into the bed liner to allow for the use of a collapsible storage container when the bed liner is installed in the bed of a truck. The collapsible storage container, when manufactured as a single piece with the bed liner may not be removed from the bed liner. For example, during manufacture, a single injection molding process may be used to form both the bed liner and the collapsible storage container.

FIG. 5A illustrates a collapsible storage container 130 embedded in a bed liner 510 that has not been installed in the bed of the truck. The arrow 520 illustrates that the bed liner 510 may be installed in the bed 120 of the truck. Once the bed liner 510 is installed in the bed 120, the collapsible storage container 130 may be collapsed and uncollapsed. The collapsible storage container 130, when in a collapsed position, may be used as the bed liner 510. FIG. 5B illustrates the bed liner 510 installed in the bed 120 of the truck. The collapsible storage container 130 is collapsed. Accordingly, the interior walls of the collapsible storage container 130 may be used as part of the bed liner 510.

Figure 5C:
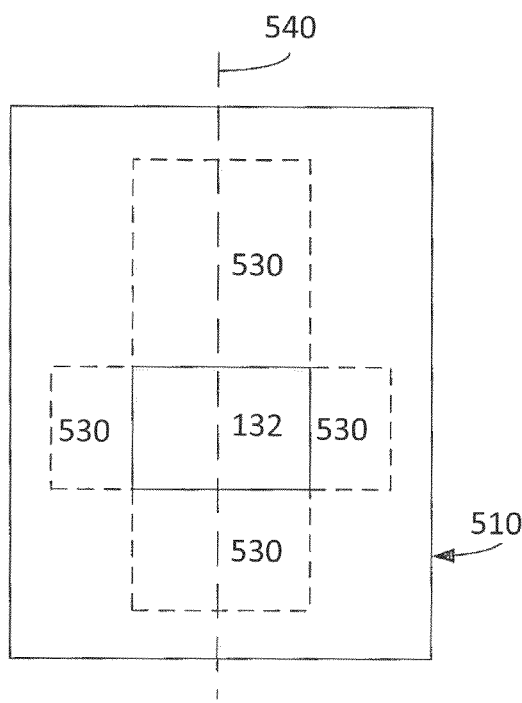
Figure 5D:
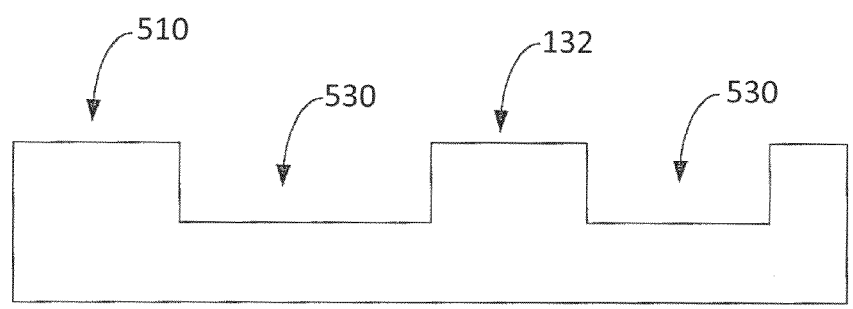

FIG. 5B illustrates a top view of a collapsible storage container 130 that is embedded in a bed liner 510. In this example, the bottom panel 132 is formed with the bed liner 510 during the manufacturing process. For example, as shown in FIG. 5C, the bed liner 510 may be formed with indentations 530 surrounding (e.g., adjacent to) the bottom panel 132, which is formed as part of the bed liner 510. FIG. 5D illustrates a side view of cross section 540 (from FIG. 5C) of the bed liner 510. As shown in FIG. 5D, the bottom panel 132 is formed as part of the bed liner 510. One or more of the other panels (e.g., 134-142) may be formed with the bottom panel 132. Otherwise, they may be connected after manufacture, for example, using hinges.

Figure 5E:
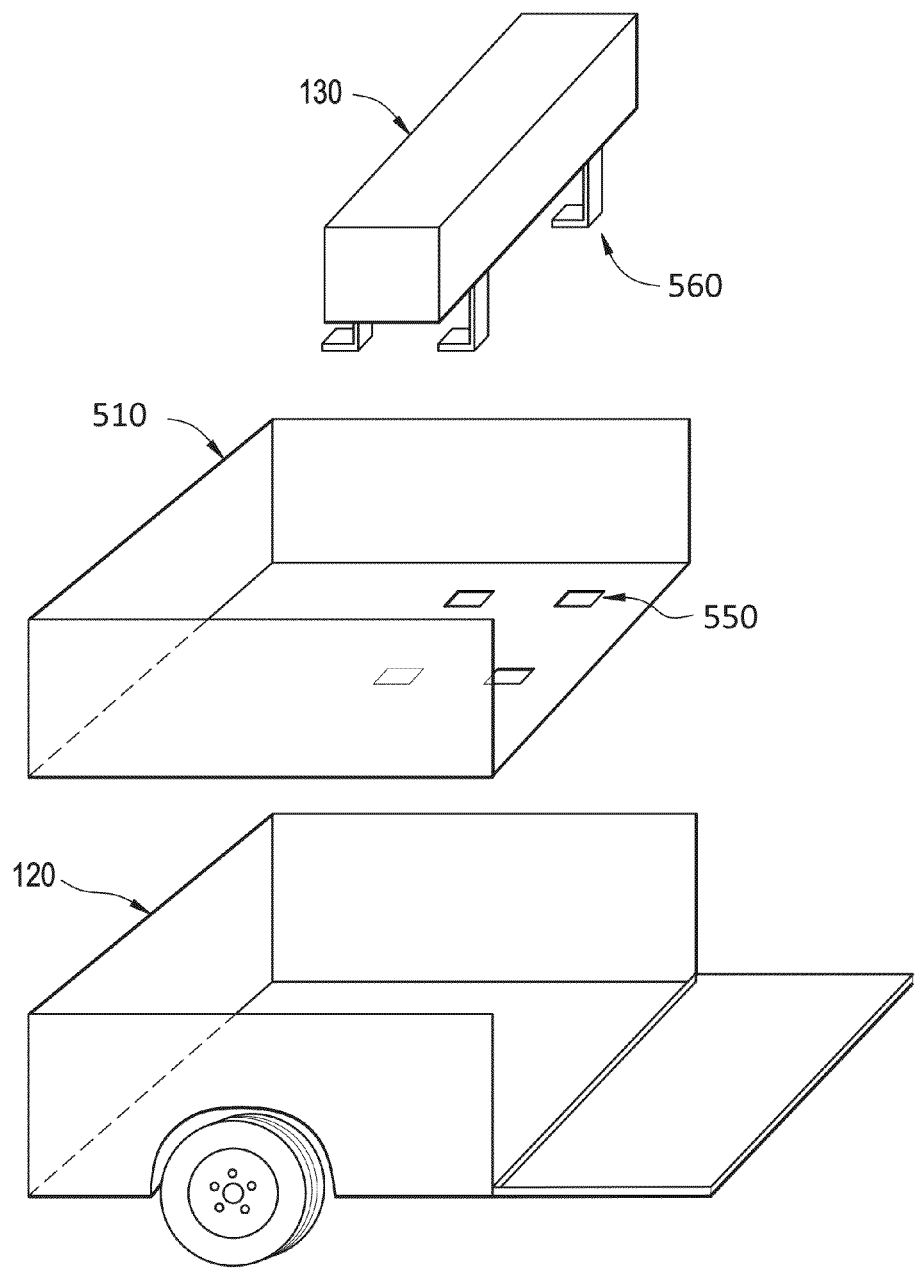

FIG. 5E illustrates another example of a bedliner 510. The bedliner 510 may be manufactured to receive a collapsible storage container 130. For example, when manufactured, the bedliner 510 may be formed to include reception slots 550. The reception slots 550 may be sized and configured to receive one or more connection devices 560 on the collapsible storage container 130. For example, prior to or after the bedliner 510 is connected to the bed 120 of the truck, one or more connection devices 560 may be inserted into the reception slots 550. When inserted, the one or more connection devices 560 may lock into the reception slots. This may lock the collapsible storage container 130 into place and prevent the collapsible storage container 130 from moving around.

In an embodiment, the bedliner 510 may be manufactured with the indentations of FIGS. 5C and 5D; however, the bedliner 510 with the reception slots does not need to include the indentations. Depending on where the connection devices 560 are located on the collapsible storage container 130, the reception slots may be located in other places of the bedliner 510. For example, the reception slots may be located on the side walls of the bedliner 510.

FIG. 5E illustrates an example of a bedliner 510 that is configured to receive or connect to a collapsible storage container. Other mechanisms may be built into the bedliner to connect the bedliner to the collapsible storage container. For example, the sides of the bedliner may include indentations as the reception slots. The collapsible storage container 130 may include one or more spring loaded rod on the side of the collapsible storage container 130. The spring loaded rod may extend when placed inside the indentation of the bed liner.

In an embodiment, a collapsible storage container is attached to a bedliner, such as the bedliner 510, that is shaped to cover the bottom of the bed of a pickup truck. In an embodiment, the bedliner 510 matches the shape of the bottom of the truck bed including sides. In an embodiment, the bedliner 510 matches the shape of the bottom of the truck bed without sides.

Accessing the Interior of a Collapsible Storage Container

Figure 6A:
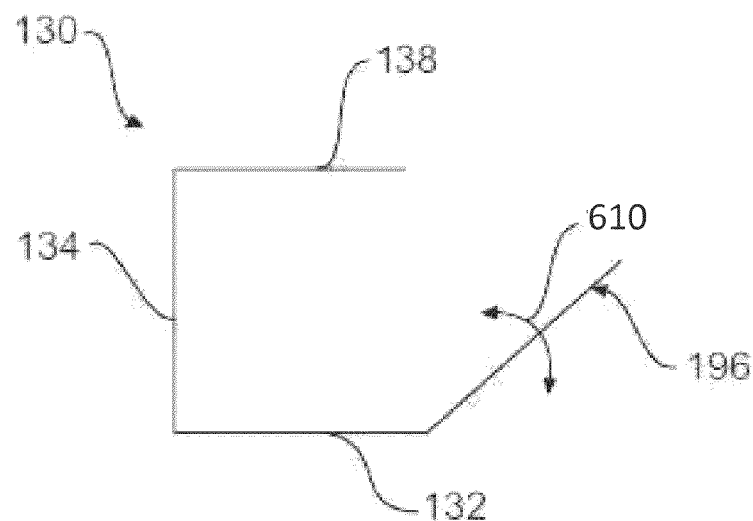
FIGS. 6A-6D illustrate various ways of accessing the inside or interior of a collapsible storage container.
Figure 6B:
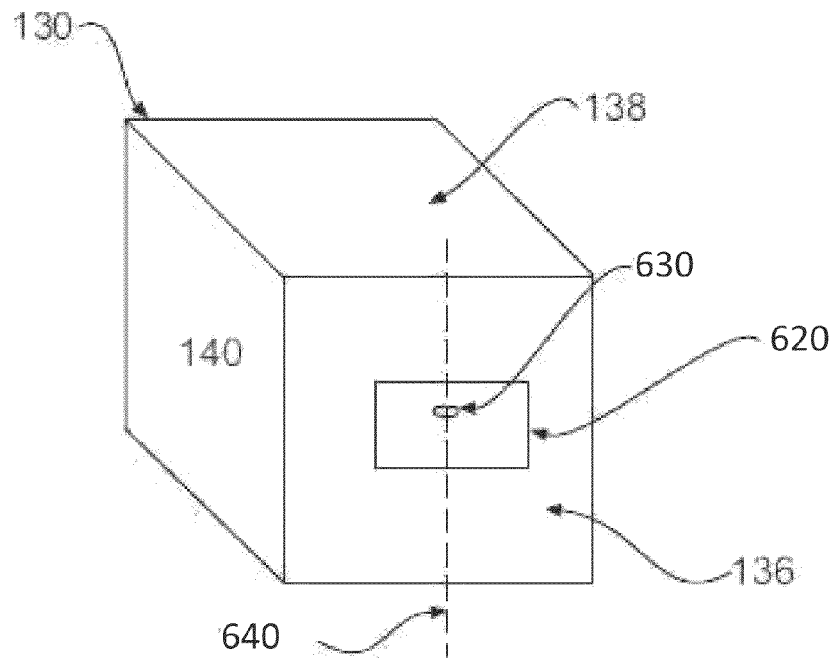
Figure 6C:
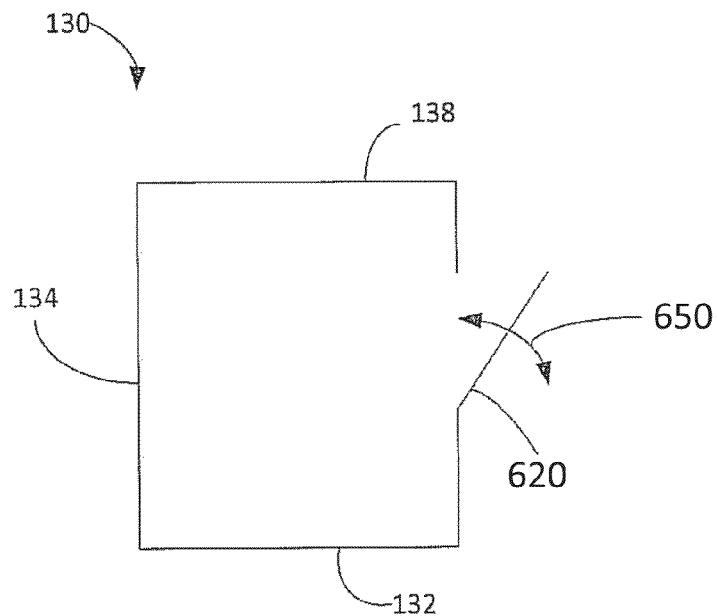
Figure 6D:
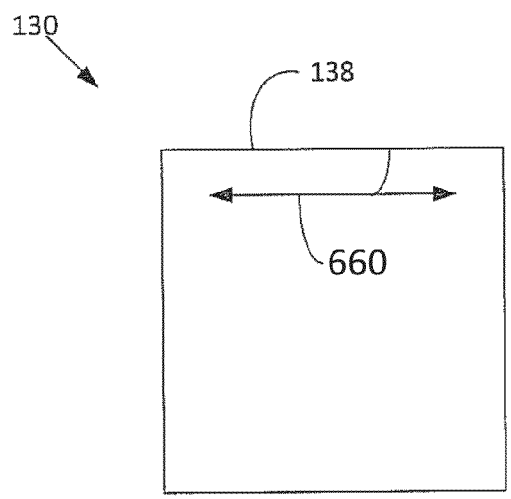

FIGS. 6A-6D illustrate various ways of accessing the inside or interior of a collapsible storage container 130. As shown in FIG. 6A, a connection system may allow the back panel 196 to open and close (shown by arrow 610) even though the other panels 132-134 and 138-142 remain in a fixed (e.g., uncollapsed) position. As shown in FIG. 6B, the back panel 196 may include a door 620 with a handle 630. As shown in FIG. 6C, the door 620 may open and close (shown by arrow 650). FIG. 6C illustrates a cross-section of the collapsible storage container 130 along the cross-section 640 of FIG. 6B. The handle 630 may allow the door 620 to latch shut. The door may be locked to prevent access to the interior. The lock may be unlocked, for example, using a key. In another embodiment, as shown in FIG. 6D, the top panel 138 may slide (shown by arrow 660). Sliding the top panel 138, for example, either to the left or right, may provide access to the inside or interior of the collapsible storage container 130. In some embodiments, the top panel 138 may slide in either direction. However, in some embodiments, the top panel 138 may only slide in one direction (e.g., either to the left or right).

In an embodiment, instead of or as alternative to one or more of the sides opening to provide access to the inside of the collapsible storage container 130, one or more of the sides may include a door or opening that provide access to the inside. For example, a door, which is smaller than a side of the collapsible storage container may be opened and closed to provide and prevent access to the inside of the collapsible storage container 130.

Additional Configuration and Collapsing Embodiments

Figure 7A:
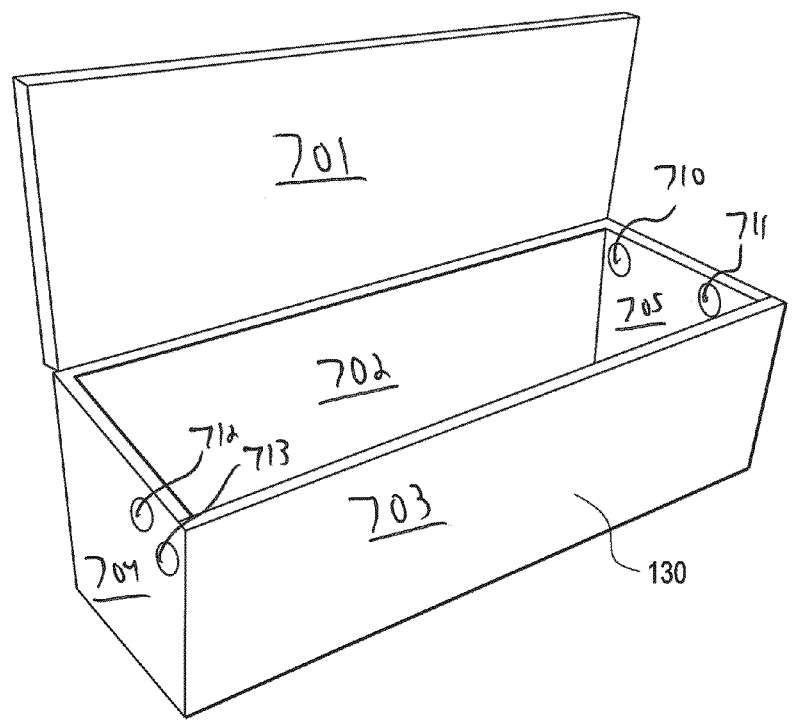
FIGS. 7A-7B illustrate an example fully erect storage container and the same example container with top and sides collapsed.
Figure 7B:
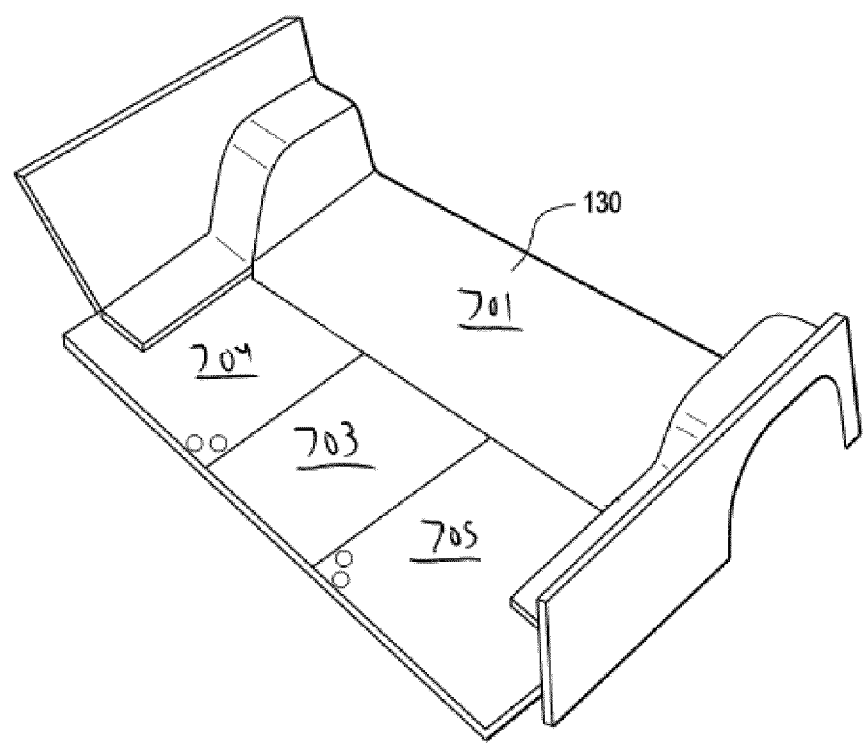

FIGS. 7A-B illustrate an example fully erect storage container 130 (FIG. 7A) and the same example container 130 with top and sides collapsed (FIG. 7B). As illustrated in FIG. 7A, end panels 704, 705 are affixed to front and back panels 702, 703 using locks and/or other connectors 710, 711, 712, 713. A top panel or lid 701 is affixed to the panel 702 and is movable to be placed on top of the container 130 to enclose the interior of the container 130 in conjunction with the base and other panels 702, 703, 704, 705. As illustrated in the collapsed view of FIG. 7B, end panels 704, 705 can be folded on top of a base 703, and panel 701 can be folded over the other panel(s) (with a panel, not shown, positioned underneath the base 703). As illustrated in the example of FIG. 7B, the collapsible storage container 130 can be integrated into and/or attached to a partial or full bedliner.

Figure 8:
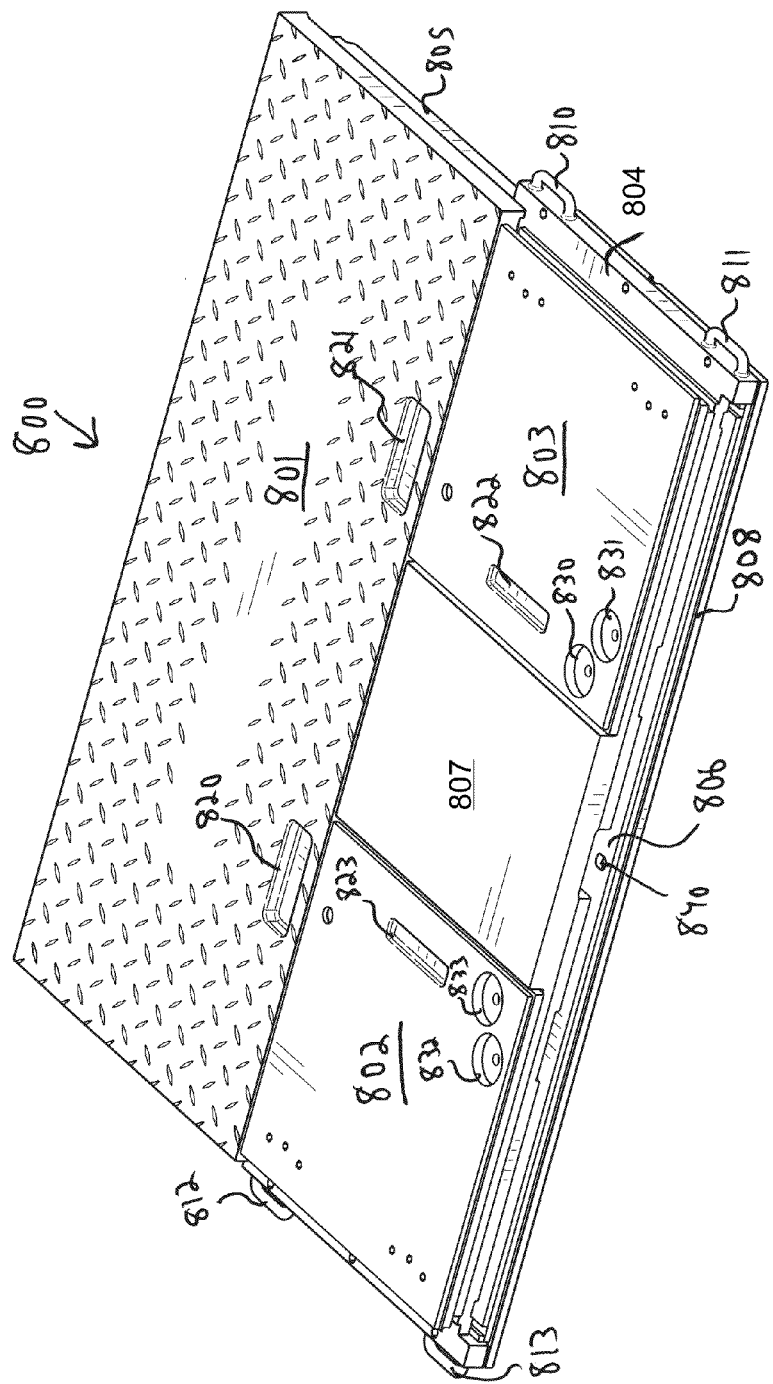
FIGS. 8-15B illustrate various views of an example collapsible storage container.

FIGS. 8-15B illustrate various views of an example collapsible storage container 800. As shown in the example of FIG. 8, the container 800 is flat or collapsed, with a top panel or lid 801 visible next to side or end panels 802, 803, which rest on top of a base panel 804. The top panel 801 rests on a rear panel 805. A front panel 806 is slid underneath the base 804. A bottom 808 protects panels 804, 806 (and one or more associated support trusses) from debris and/or other interference, for example.

As shown in the example of FIG. 8, the base 804 may include a raised portion 807 situated in between the ends 802, 803. In embodiments of such as example, a rod and/or other lock can be maneuvered into the raised portion 807 using one or more knobs, levers, latches, and the like 830-832. The end panels 802, 803 can thereby be secured with respect to the portion 807 and panel 804 and will not move or flap around until unlocked. In other embodiments, the middle portion 807 is not raised but is rather flush with the panels 802, 803 and/or the rest of the base 804, for example.

As illustrated in the example of FIG. 8, the bottom 808 covers the front panel 806 and base 804. Thus, the container 800 can be installed in the bed of a truck or trailer or other vehicle and withstand weather. For example, a box 800 installed in the bed of a pickup truck may be exposed to weather and/or other environmental elements such as rain, snow, sleet, hail, dirt, debris, etc., which can be very invasive. Without a bottom, these elements can become lodged underneath the container and have the potential, without a bottom or other covering, to render the unit inoperable.

As shown in the example of FIG. 8, one or more handles 810-813 can be provided to allow a user to manipulate the container 800 to carry the container 800 and/or maneuver the box 800 into and out of an erected state and a collapsed state (collapsed is shown in FIG. 8). Further, each panel 801-806 can include a handle or handhold 820-823 to help provide better ease of use to a user manipulating the container 800. The knobs/levers/latches/or the like 830-833 help to secure the end panels 802-803 to one or more other panels 804, 805, 806, depending upon whether the container 800 is collapsed or uncollapsed, for example. In certain examples, such as the one shown in FIG. 8, the container 800 can include a lock 840 to secure portion(s) of the container 800 while erected and/or collapsed. In certain examples, handle(s) 810-813, knobs, latches, etc., can also be used to aid a user in tying down and/or otherwise securing the container 800 to the vehicle.

In certain examples, the container 800 provides a non-invasive attachment mechanism by which the weight of the container 800 itself (alone or in conjunction with a ballast) is sufficient to hold the container 800 in position without having to attach the container to a vehicle using an external device such as screws, latches, ties, etc.

Figure 9A:
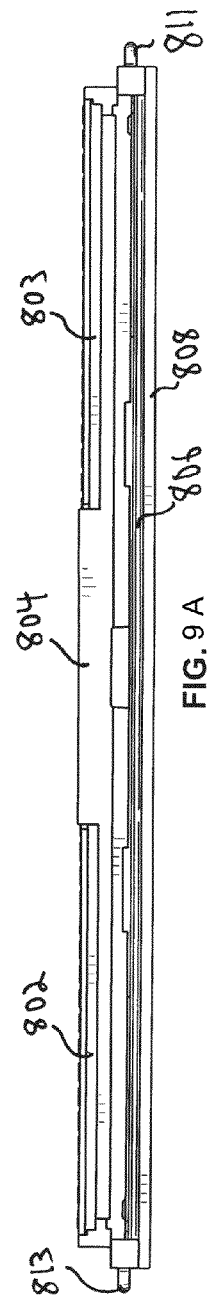
Figure 9B:
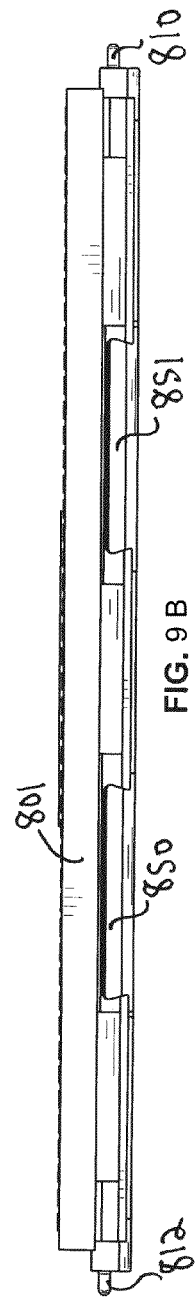

FIGS. 9A-D illustrate view end and side views of the collapsed storage container 800. FIG. 9A shows a front view of the end panels 802, 803 (resting on top of the base 804) and the front panel 806 (slid underneath the base 804) with handles 811, 813 provided for carrying the container 800. FIG. 9B illustrates a back view in which the top 801 is visible as are support trusses 850, 851. The trusses 850-851 are attached to the front panel 806 (not visible in this view) and run underneath the base 804 to provide support to the base 804 (and thereby to the rest of the container 800), even while one or more panels (e.g., the front panel 806) is moving from a collapsed position to an erected position. While the example of FIG. 9B shows two trusses, it is to be understood that a variety of truss configurations can be used depending upon container 800 size, container 800 construction material, target cargo weight, etc. For example, the container 800 can be provided in a one-truss configuration, a two-truss configuration, a three-truss configuration, a four-truss configuration, a five-truss configuration, a ten-truss configuration, and so on.

Figure 9C:
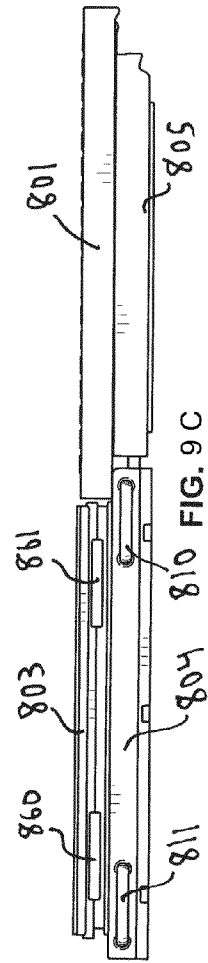
Figure 9D:
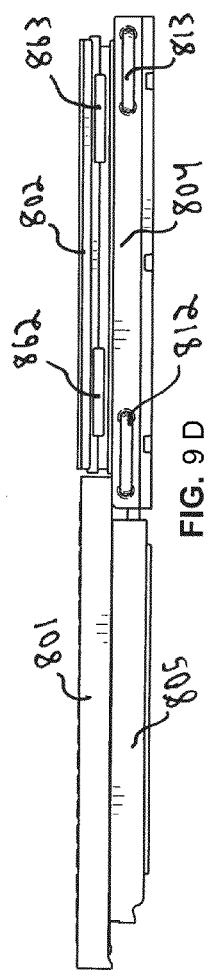

FIGS. 9C-9D provide first and second side views of the example container 800 in a collapsed position. As shown in FIGS. 9C-9D, the example container 800 includes one or more hinges 860-863 connecting the end pieces 802, 803 to the base 804. The hinges 860-863 can be implemented as metal hinges, rubber hinges, living hinges formed with the connected panels, double pivot hinges, etc.

Figure 10:
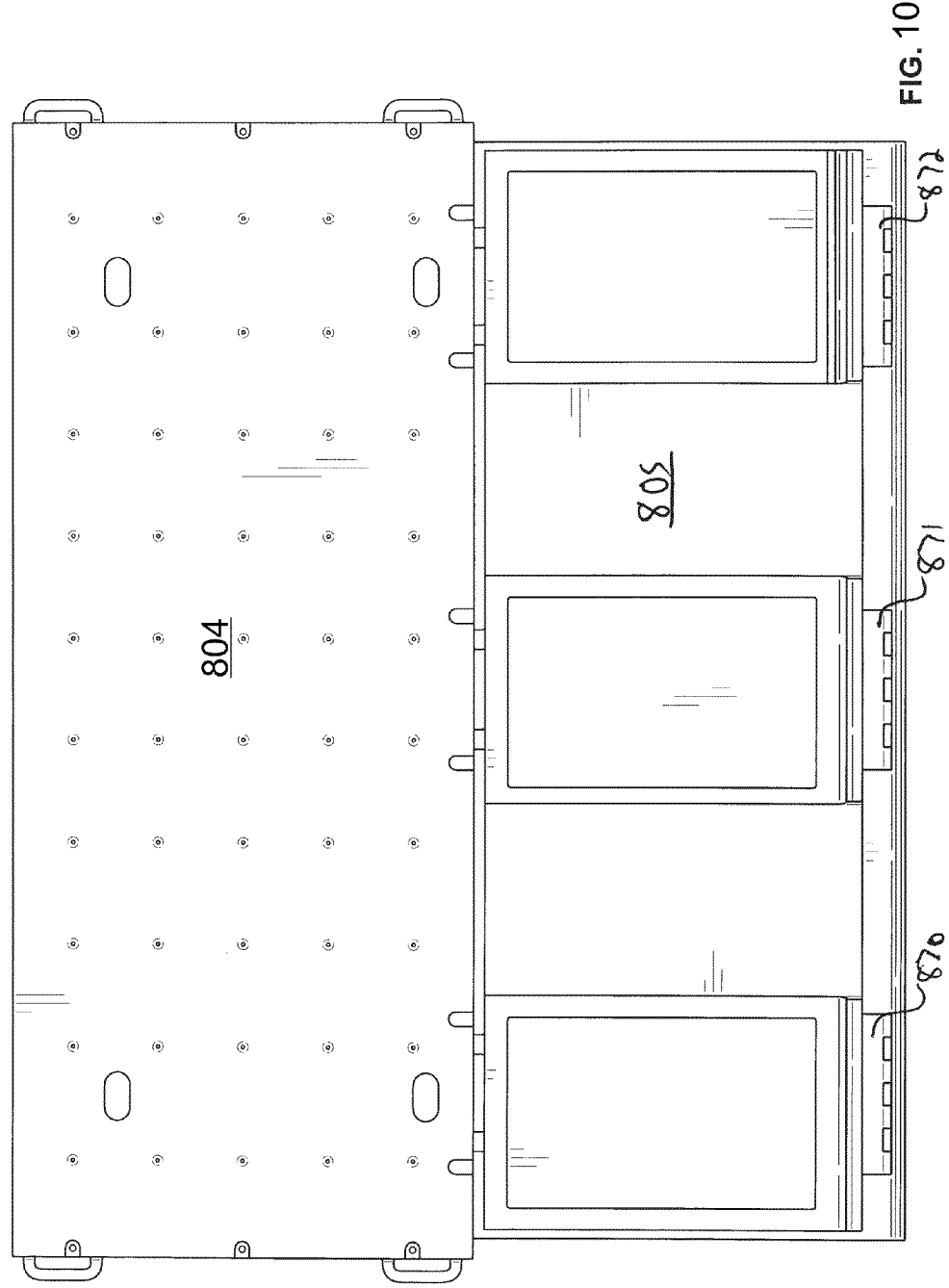

FIG. 10 provides an example of a semi-expanded view of the container 800 in which the base 804 and the back panel 805 are visible. As shown in the example of FIG. 10, the back panel 805 includes one or more hinged portions 870-872 movable to help bring the container 800 into an out of a collapsed and/or erected position.

Figure 11:
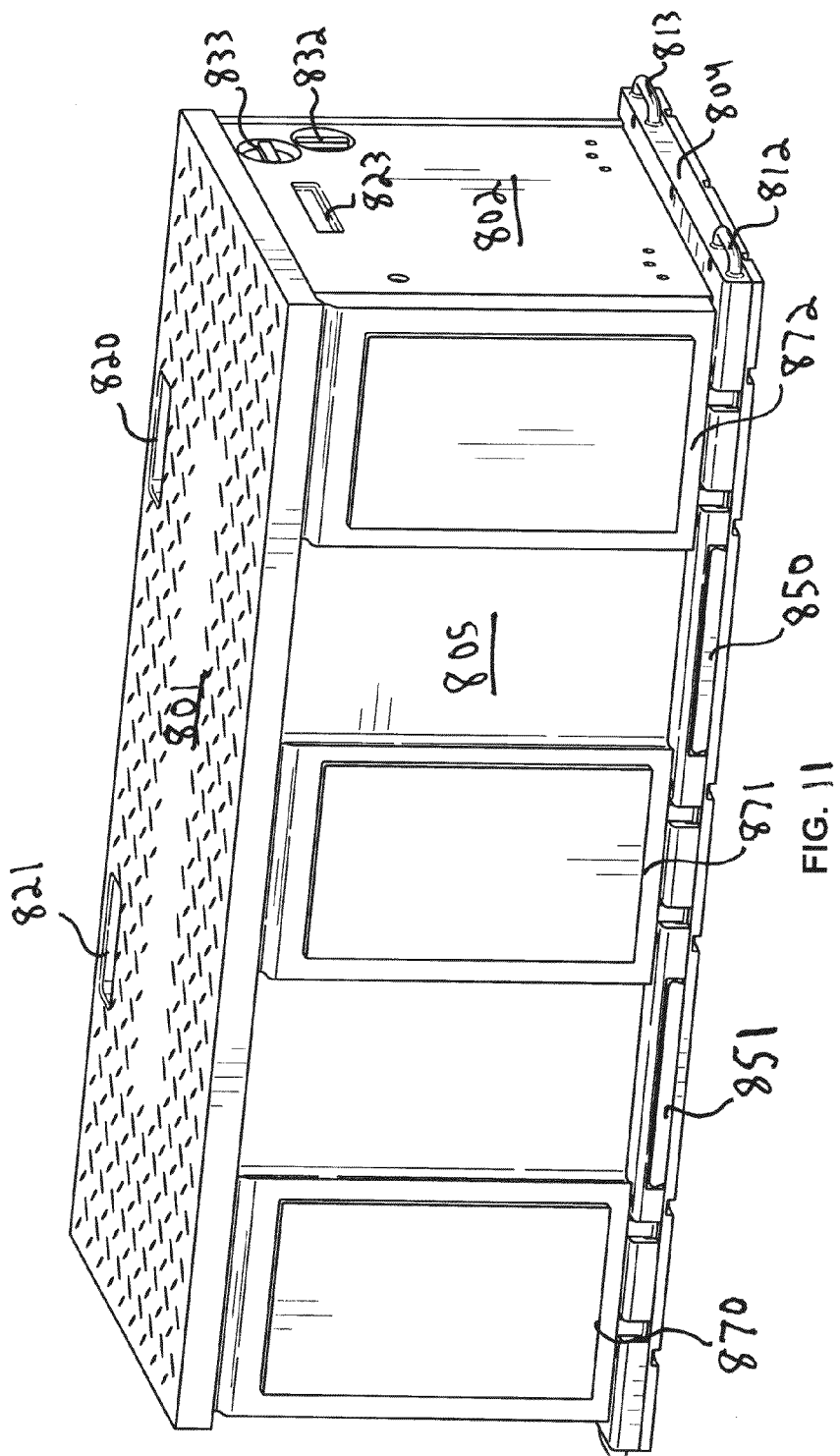

FIG. 11 illustrates an example container 800 in a fully erected state. As shown in the example of FIG. 11, one or more trusses 850-851 are positioned underneath or within the base portion 804 to provide movable support to all or part of the container 800. Thus, when the container 800 is loaded and/or empty and the front panel 806 is moved to be slid under or into the base 804, the trusses 850-851 continue to provide support to the base 804 and move in concert with the panel 806 along a direction of travel of the panel 806.

In certain examples, the front panel 806 fits tightly against the side panels 802, 803 when the container 800 is erected. The front panel 806 slides out underneath the base 804 (and over the top of the bottom 808), and, when it does, the front panel 806 pulls one or more attached trusses out from their "resting position" located in a gap between the base 804 and bottom 808 at the front edge of the box 800 (e.g., closest to the cab of a truck). Slots in the truss(es) can then be used to index the bottom of the front panel 806 to help insure that when the front panel 806 is raised up to contact the side panels 802-803, a gap at the bottom of this front panel 806 is pinched. This "cam" action allows the trusses (which cannot move further toward the front panel 806 due to these slots), to hold the front panel 806 in a tight and predictable position, for example.

In certain examples, when the collapsible box 800 is in transition between its collapsed and non-collapsed positions, there will be a time when one or more panels will have to be held in a certain position to receive the corresponding panel as they are brought together. For example, most containers have at least five sides which move: front, top, back, and two sidewalls. Since a person only has two hands, it is difficult to raise and connect all of the sides at the same time. Instead, certain examples of the container 800 include "stays" incorporated into a contour of the base 804, which hold the two sidewall panels 802, 803 of the collapsible container 800 in a desired position when the corresponding back 805 and top 801 are brought to them to be connected.

In certain examples, the side panels 802, 803 are designed with a tongue and groove shape that has a dual purpose. A first purpose is to incorporate a "tortuous path" for incoming water or moisture that would get through any gap or crack remaining when two panels are connected. A second function of the tongue and groove is that their design (e.g., tapered) allows panels that are in the process of being connected to "index" at a point at which the panels first touch and then stay in alignment as the panels are continued to be brought together. Using a slight taper (e.g., wider at the bottom and narrower at the top), as the panels come together, misalignment can be accommodated by the tapered tongue and groove.

In certain examples, the side panels 802, 803 are designed with a cavity near the top of the inside surface of each panel in which a pipe, rod, or other ridged device can be inserted. When inserted, the pipe and/or other device provides a continuous connection across the container 800 (e.g., from side panel 802 to side panel 803). The pipe and/or other device then functions like a closet rod, allowing a user to strap or hang personal items on the rod for transport inside the container 800.

In certain examples, a series of hooks can be attached to the pipe, rod, and/or other ridged device to allow sacks to hang from the hook without having to be strapped or tied to the pipe. A user can place a sack over a hook, and the sack can then swing freely rather than spilling and allowing items to roll around in the container 800.

In certain examples, the container 800 includes both a base 804 (e.g., a bottom of a cavity formed in the erected or un-collapsed position of the container 800) and a bottom 808, which rests against the vehicle bed. The bottom 808 creates a cavity between the vehicle bed and the base 804 to allow the front panel 806 and truss system 850-851 to be housed when the container 800 is in its collapsed position. This bottom 808 also is what keeps the trusses 850, 851 from falling out of their position when the container 800 is, from time to time, removed from the vehicle for cleaning, etc.

Figure 12:
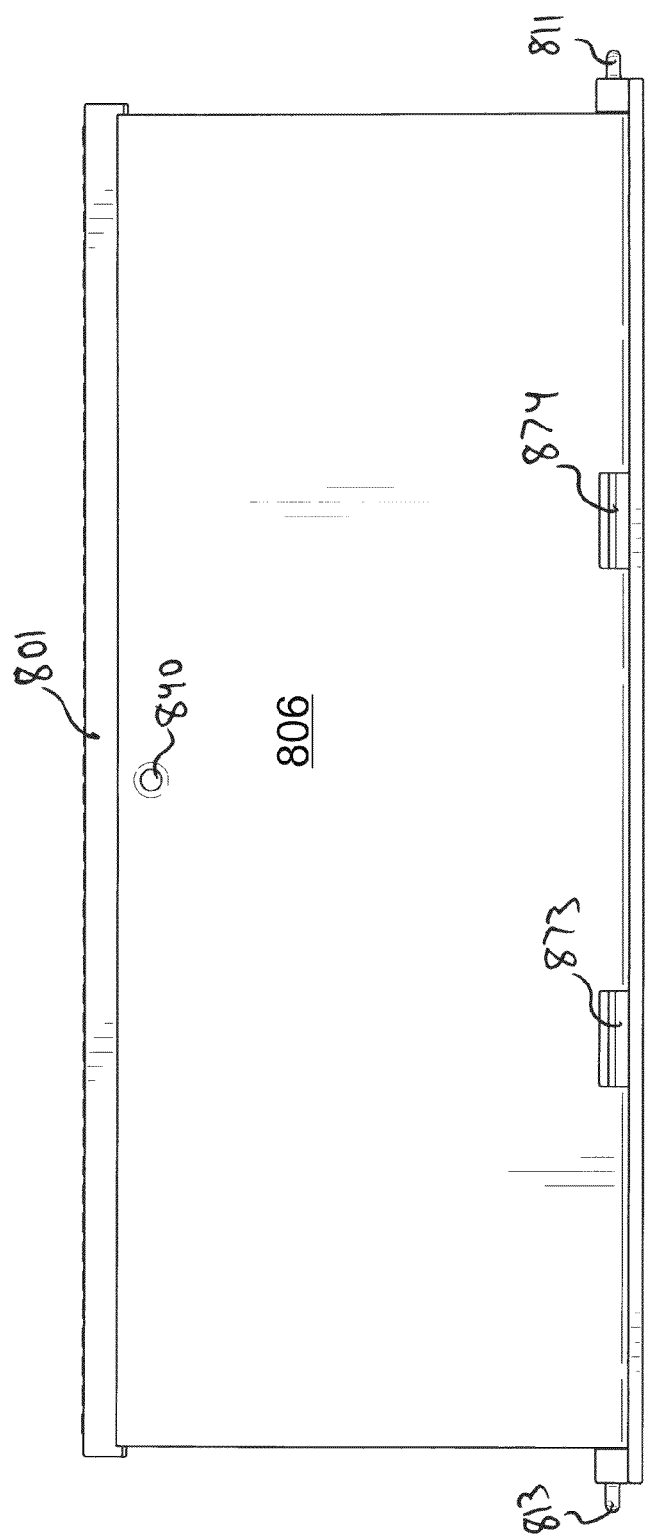

As shown in the example of FIG. 12, the front wall 806 of the container 800 is hingedly attached to trusses 850, 851 and is also attached to top and side through latches. The walls of the container 800 can be ridged, for example, and collapse horizontally. In certain examples, latches 830-832 are used to hold the container 800 together in its erected or un-collapsed position. In certain examples, the latches 830-832 are designed to be imbedded deeply enough in the panels that they do not project past a surface plane of the panels, allowing for cargo to slide conveniently over the top of them when the unit 800 is collapsed. Certain latches can serve a dual purpose in that they not only hold the container 800 together in its erected or un-collapsed position but also secure panels 802, 803 down to the base 804 in a collapsed position.

FIG. 12 shows an example front view of the container 800. As shown in the example of FIG. 12, a lock 840 can be provided to secure closure of the erected container 800, for example. One or more additional hinges 873, 874 can be used to facilitate movement of the front panel 806 with respect to the base 804. As previously described, the front panel 806 can slide under and/or into the base 804 for ease of storage. For example, by sliding the front panel 806 underneath and/or into the base 804, the container 800 can be placed at or near the tailgate of a truck without worrying about the front panel 806 extending unsupported beyond the bed or tailgate of the truck (e.g., hanging in mid-air). To facilitate such movement, the panel 806 can be attached to one or more trusses 850, 851 via hinges 873, 874, for example.

Figure 13:
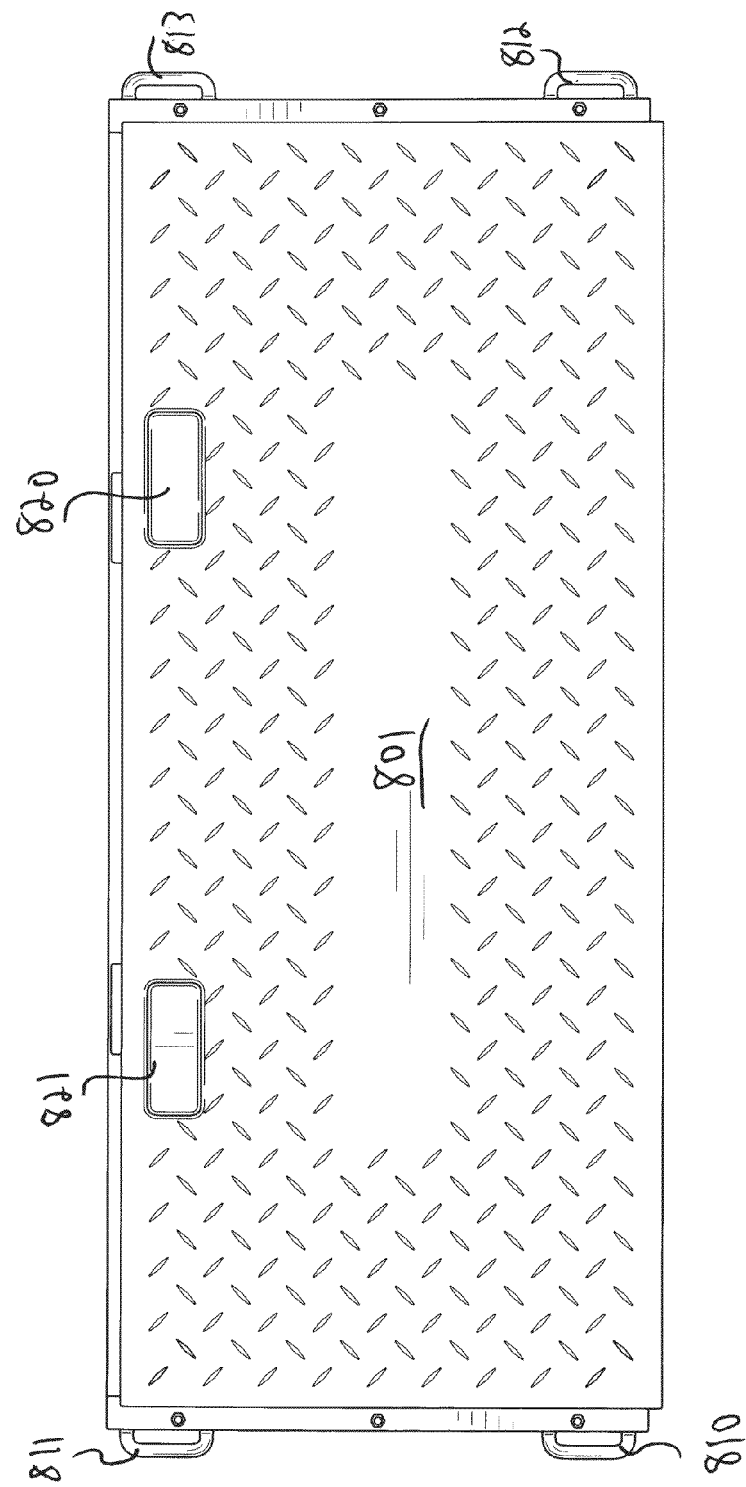
Figure 14:
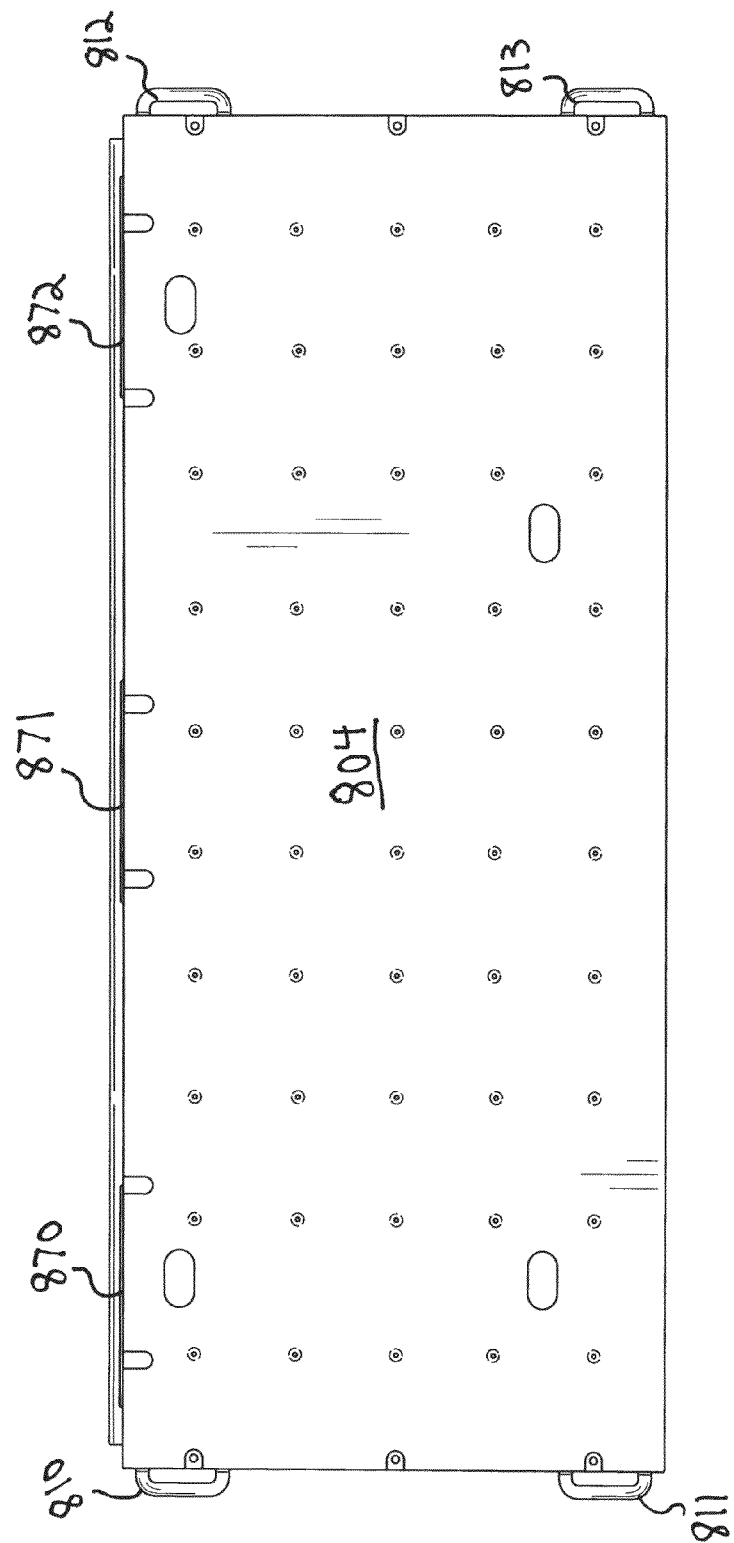
Figure 15A:
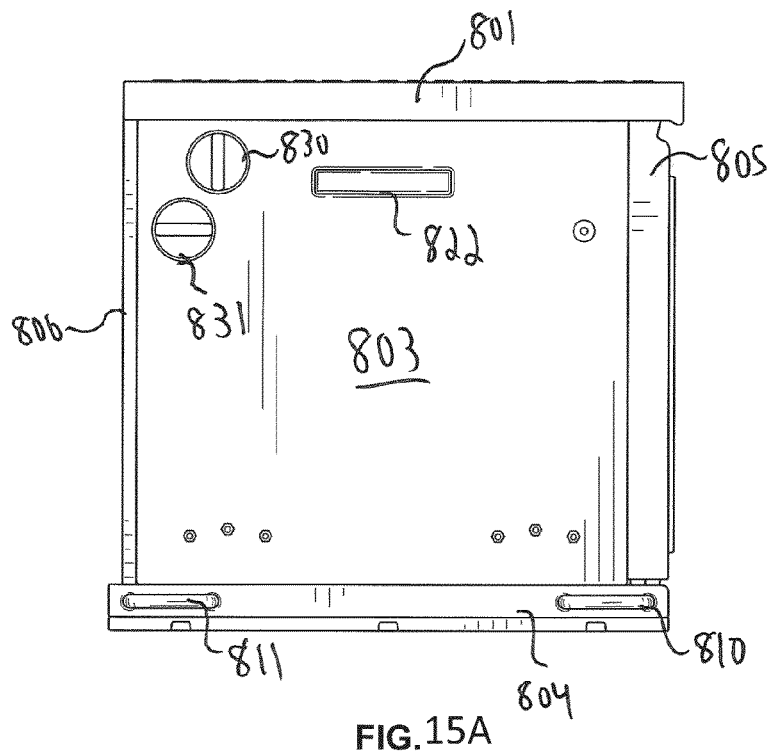
Figure 15B:
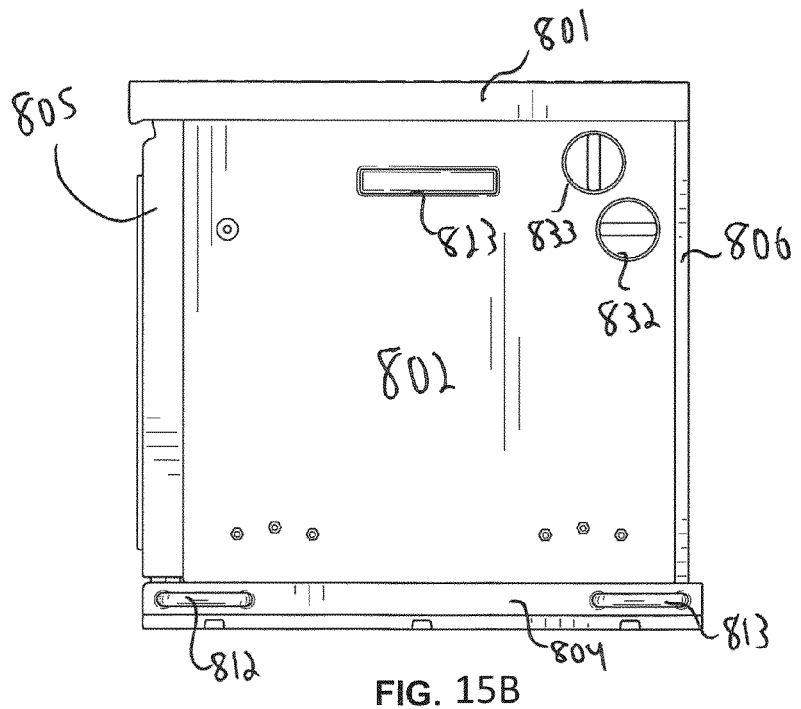

FIG. 13 shows an example top view of an erected storage box 800 including the top panel 801, lid handles 820-821, and base handles 810-813. FIG. 14 shows an example bottom view of the erected storage box 800 including the bottom panel 804, hinges 870-872, and handles 810-813. The bottom panel 804 can include one or more holes, notches, and/or other recessions to accommodate hooks, latches, knobs, and/or other protrusions to keep the container 800 from moving on the vehicle bed, for example. FIGS. 15A-B illustrate first and second side views of the erected storage container 800 including handles 810-813, handhold areas 822-822, and locks/latches 830-833 to help keep the panels 804-806 in an uncollapsed configuration.

Thus, as demonstrated in the example of FIGS. 8A-15, the container 800 can be formed from six solid panels. No "frame" is necessary to hold the panels, and no panel "segments" are necessary to keep the side panels straight. Rather than disconnecting panels to collapse the container 800, the front panel slides under the base of the box and the remaining panels fold down on top. When the front panel is pulled out, one or more trusses provide support to the base of the box. In certain examples, slotted trusses can only retract a limited distance, and this makes the front panel tight against the side walls. The side panels are held vertical due to permanent "stays" on the edges. The tongue and groove on the panels aligns the panels with each other.

Because the side panels are formed from a plastic, metal, and/or other hard material, the unit 800 can be locked (e.g., in collapsed, partially collapsed, and/or erected configurations, etc.). In certain examples, the side panels can be locked and the front panel can be opened.

The container 800 rests on a vehicle bed when fully collapsed, partially collapsed, fully uncollapsed/erected, etc. The container 800 can be operated with a vehicle tailgate up or down, and the vehicle tailgate can be opened even when the container 800 is fully of cargo.

In the example container 800, the one or more trusses 850-851 are oriented perpendicular to the front panel 806 and may not even touch the sides of the base 804. Rather than guiding the front panel 806, the truss(es) 850-851 provide support for the base 804 of the container 800.

Figure 16:
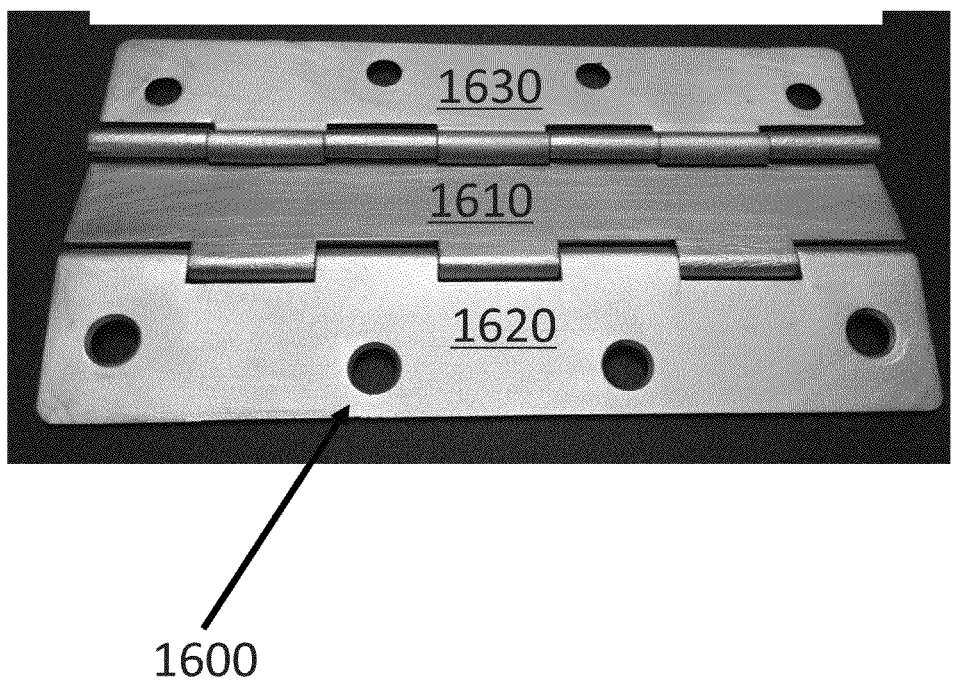
FIG. 16 shows an example of a hinge that can be used to implement one or more of the hinges used in the example container.

FIG. 16 shows an example of a hinge 1600 (e.g., a double hinge) that can be used to implement one or more of the hinges 870-874 used in the example container 800. As shown in the example of FIG. 16, the hinge 1600 provides a double pivot point without having to move fastening of screws attaching the panels to the hinge 1600. Panels attached to the hinge 1600 can pivot in two separate directions simultaneously. The hinge 1600 can be formed from plastic, stainless steel, other metal, etc. The hinge 1600 allows attached panels to freely move upward or downward, collapse, lay on top of each other, and so on. A center portion 1610 and two side portions 1620, 1630 facilitate the multi-directional pivot for panels and/or other materials attached to each side portion 1620, 1630 via holes in each side portion 1620, 1630. A panel and/or other item can be affixed to a side portion 1620, 1630 via one or more screws, nails, bolts, etc., via the one or more holes provided in each side portion 1620, 1630.

Figure 17A:
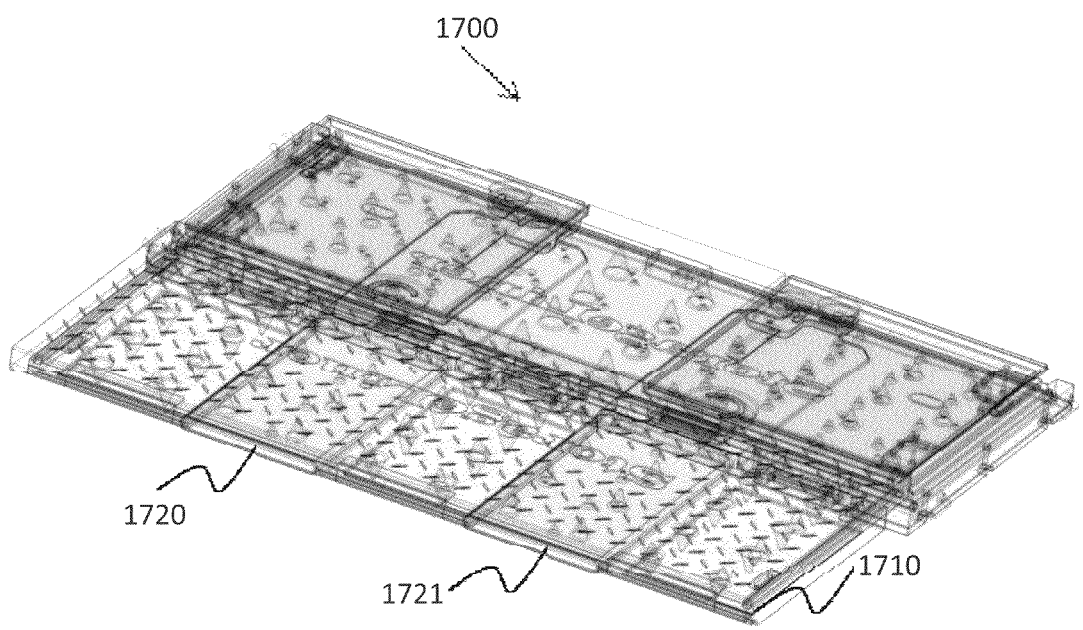
FIGS. 17A-17B illustrate views looking up at the bottom of an example collapsed storage container.
Figure 17B:
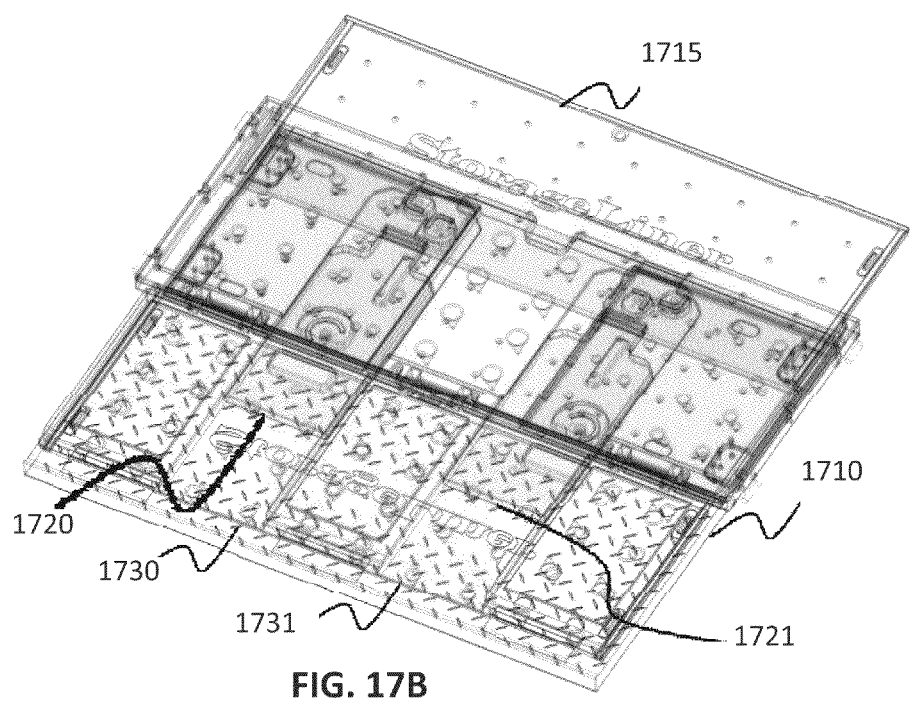

FIGS. 17A-B illustrate views looking up at the bottom of an example collapsed storage container 1700. The example container 1700 includes two support trusses 1720-1721 arranged with respect to a base 1110. As demonstrated in the example of FIG. 17A, the trusses 1720-1721 are positioned with respect to an edge of the base 1710 when the container 1700 is fully collapsed. In contrast, the example of FIG. 17B shows that each truss 1720, 1721 moves with respect to the base 1710 as panel 1715 is extended from the base 1710 (e.g., to erect the container 1700). As the panel 1715 is extended from underneath the base 1710 to pivot up and help to form the uncollapsed box, a distance between an edge of the base 1710 and an edge of each truss 1720-1721 along a channel 1730-1731 for each truss 1720-1721 increases (as illustrated in the example of FIG. 17B). Thus, each truss 1720, 1721 moves in a direction of movement of the associated panel 1715 to help ensure that support is continued to be provided to the base 1710 of the container 1700 even as the panel 1715 is not in a position to do so itself.

Figure 18A:
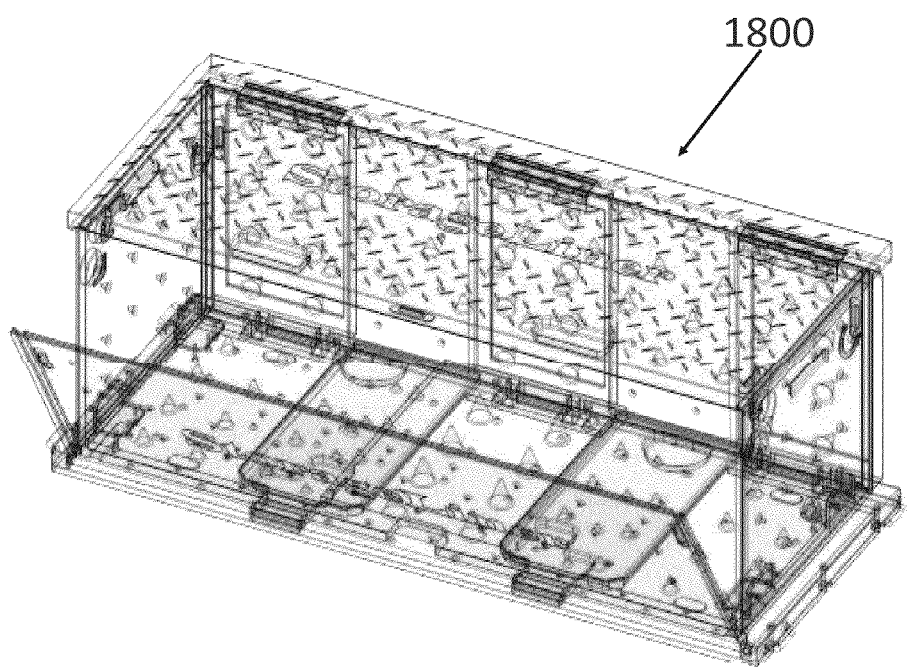
FIGS. 18A-18CC provide an illustration of a sequence of panel movements to erect and then collapse an example storage container.
Figure 18B:
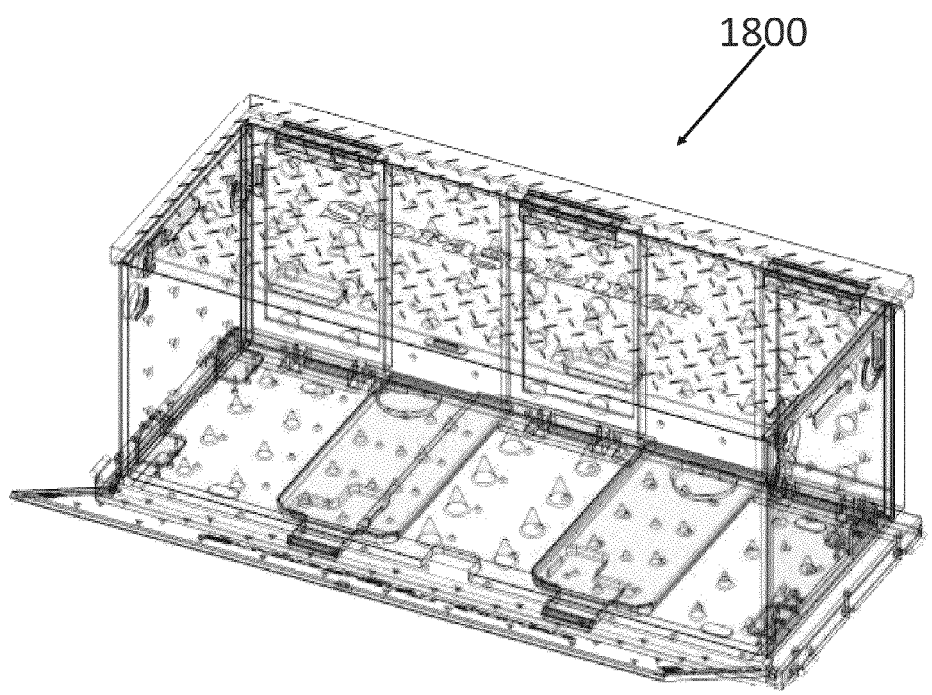
Figure 18C:
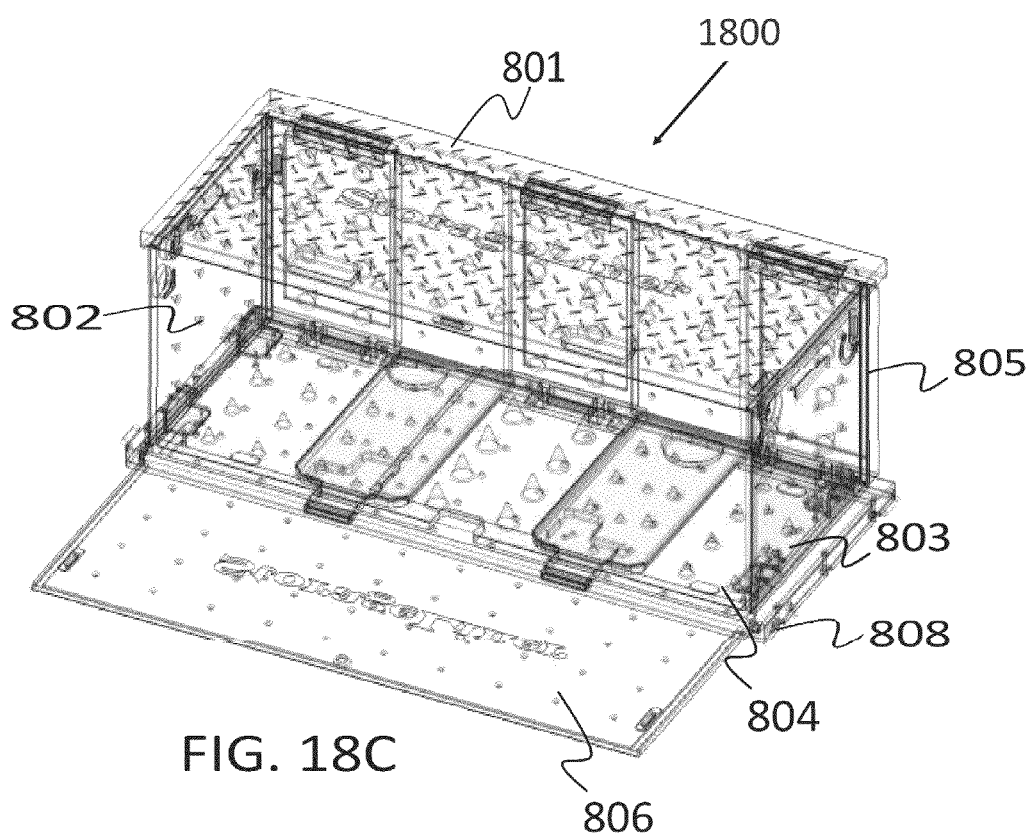
Figure 18D:
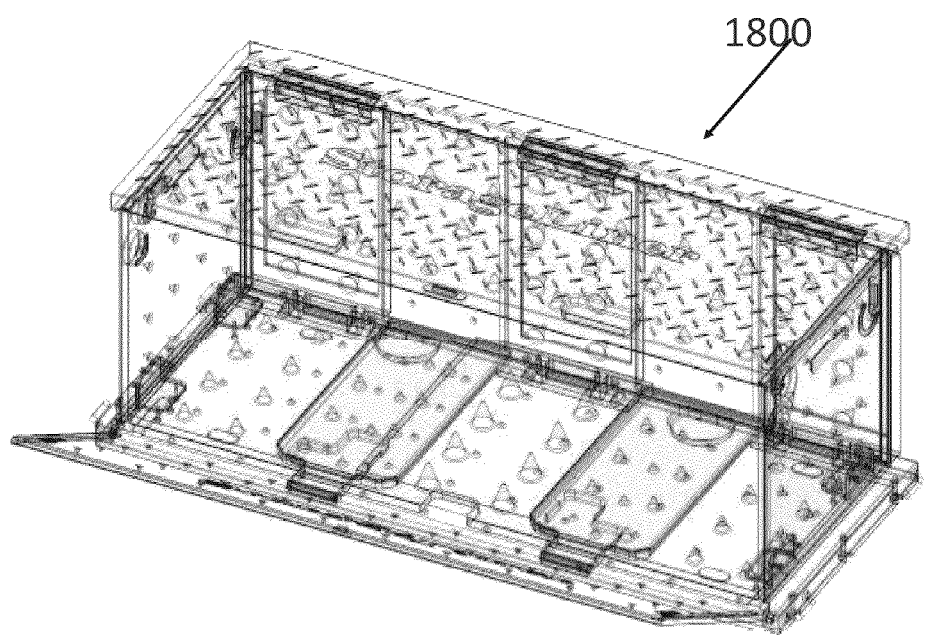
Figure 18E:
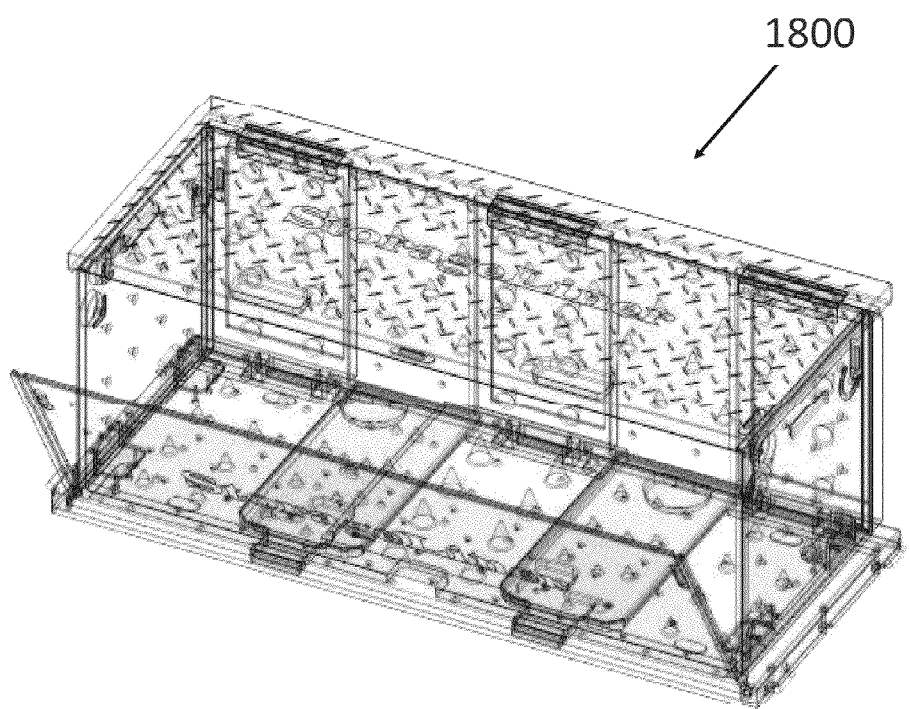
Figure 18F:
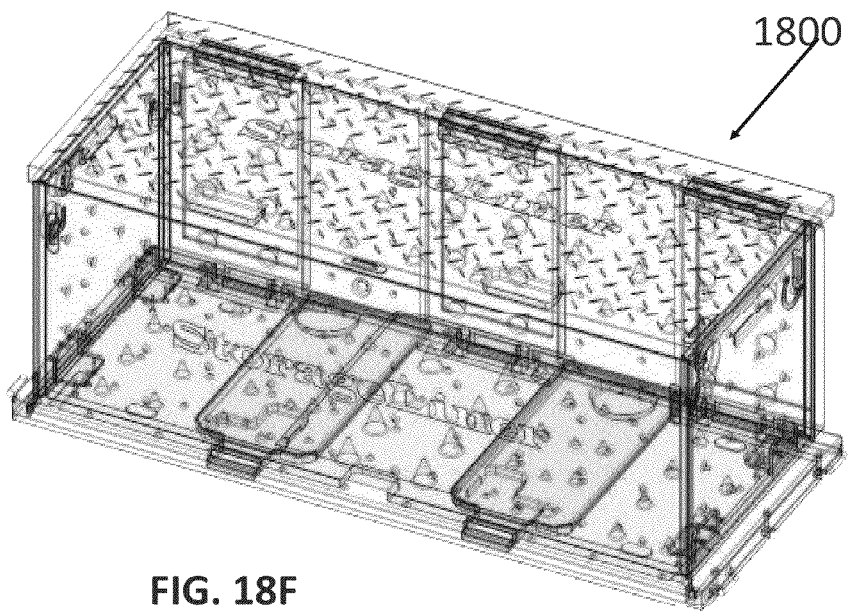

FIGS. 18A-18CC provide an illustration of a sequence of panel movements to erect and then collapse an example storage container 1800. FIG. 18A shows the example container 1800 with a front panel opening to allow access into an interior of the container 1800. In FIG. 18B, a next snapshot of panel movement shows the front panel open further, and FIG. 18C shows the front panel fully open in a plane of a base of the container 1800. In FIG. 18D, the front panel is moving closed again, and FIG. 18E shows the front panel moving even closer to a closed position against the side and top panels of the example container 1800. Such a closed position is illustrated in the example of FIG. 18F.

Figure 18G:
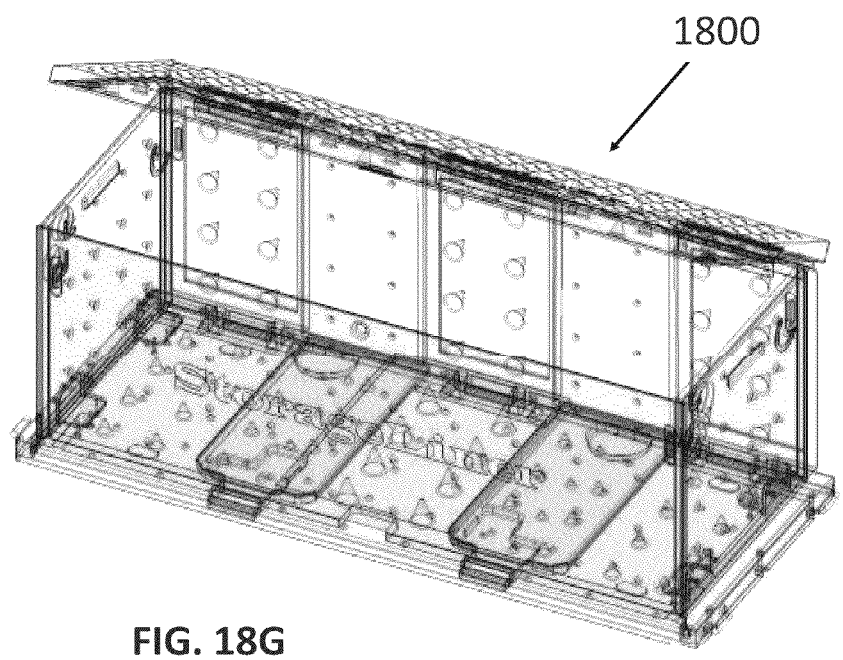
Figure 18H:
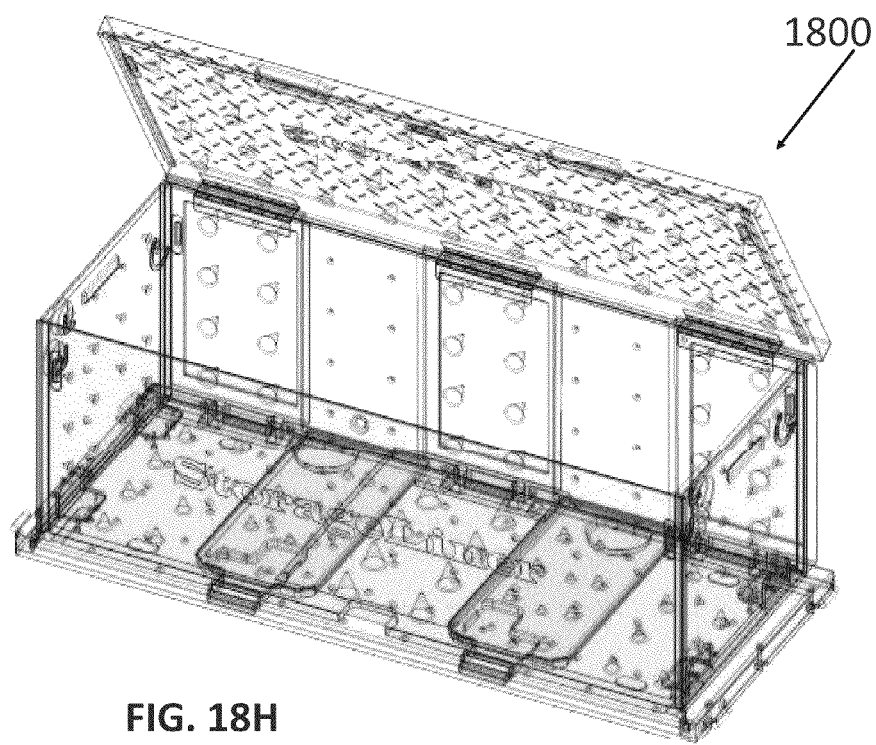
Figure 18I:
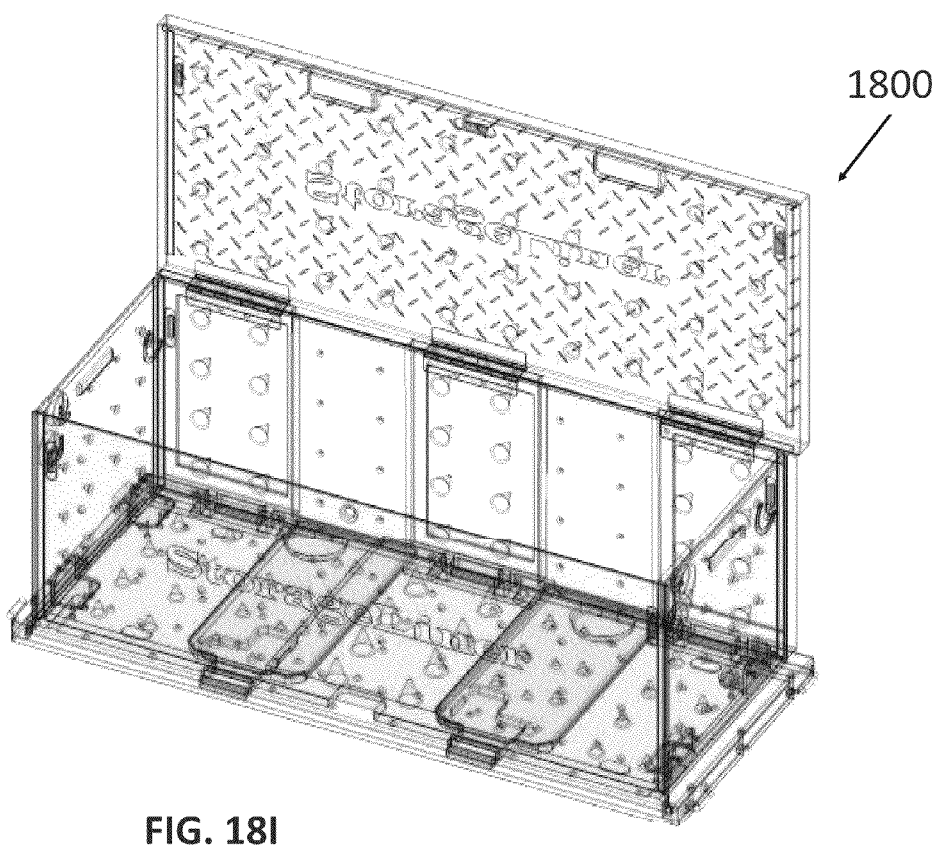
Figure 18J:
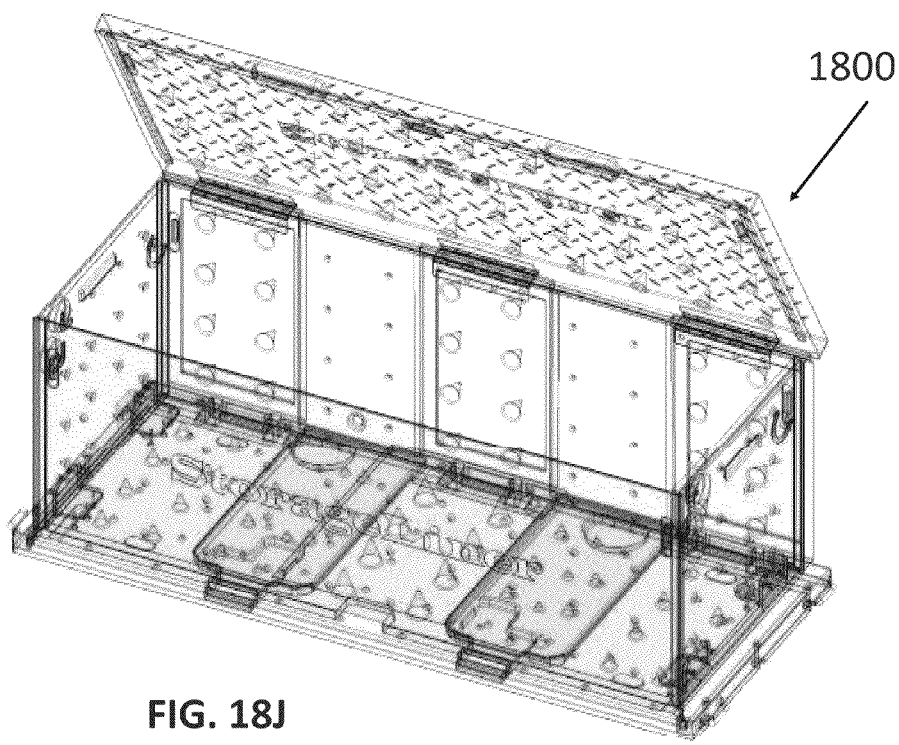

In the example of FIG. 18G, a top panel of the container 1800 is opening. FIG. 18H illustrates the top or lid of the example container 1800 even more open. FIG. 18I shows the top in a fully raised position. FIG. 18J shows the lid moving toward a closed position again.

Figure 18K:
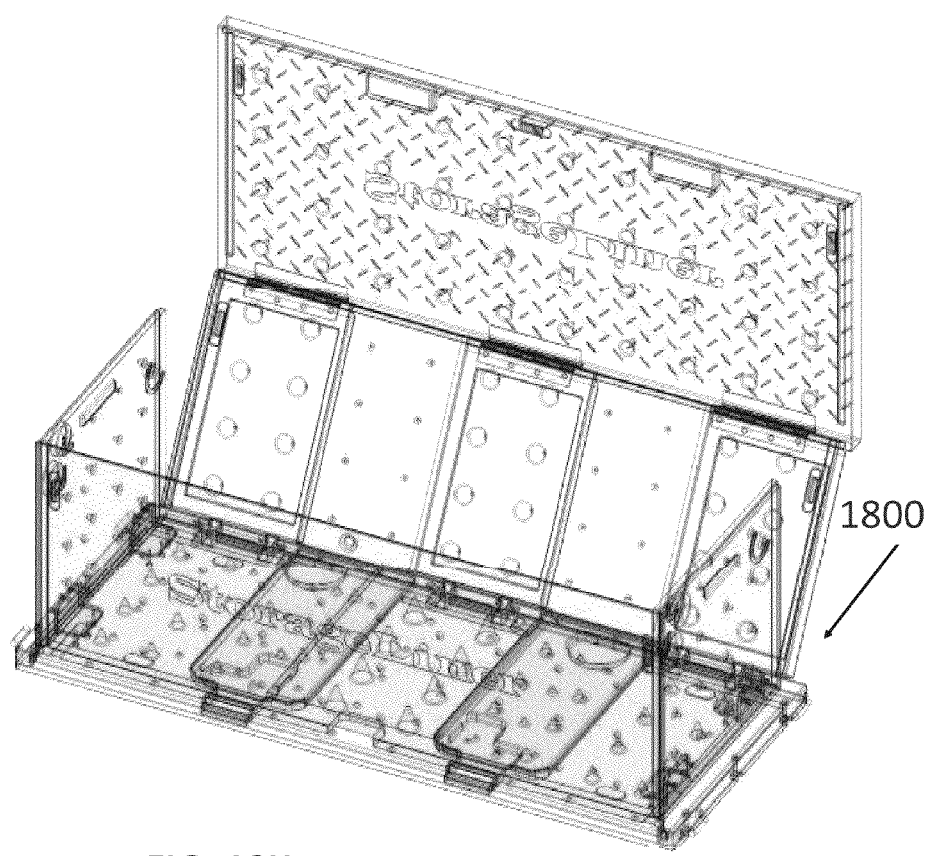
Figure 18L:
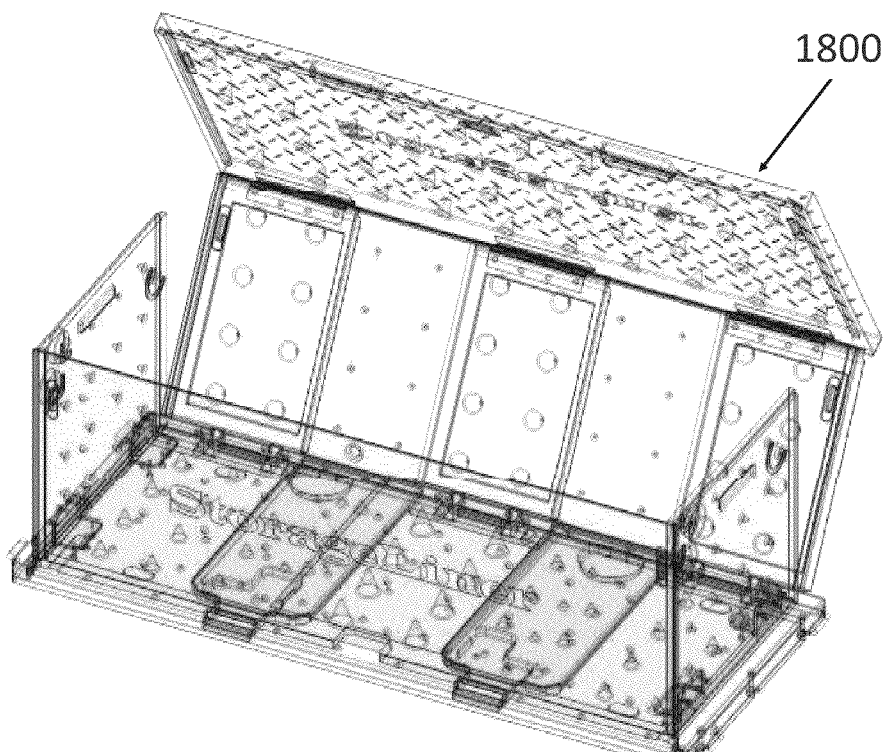
Figure 18M:
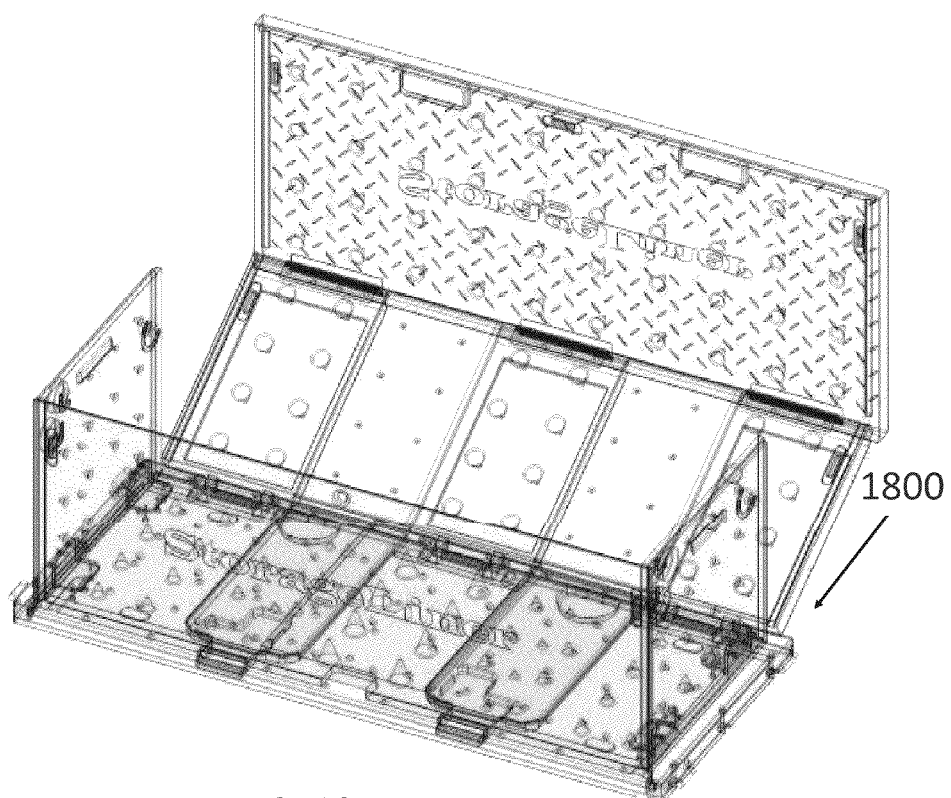
Figure 18N:
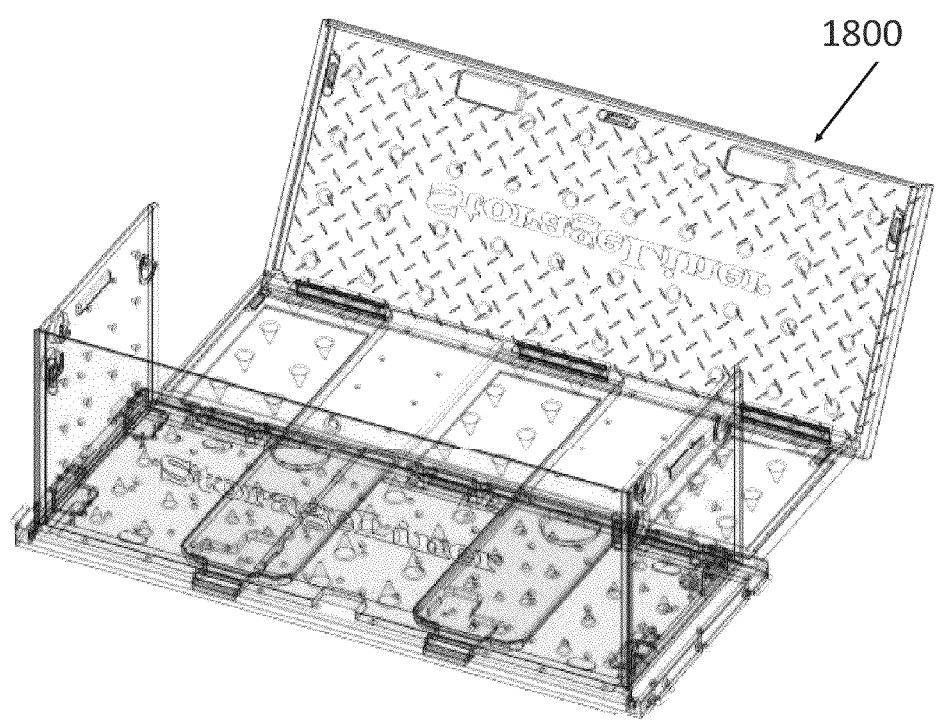
Figure 18O:
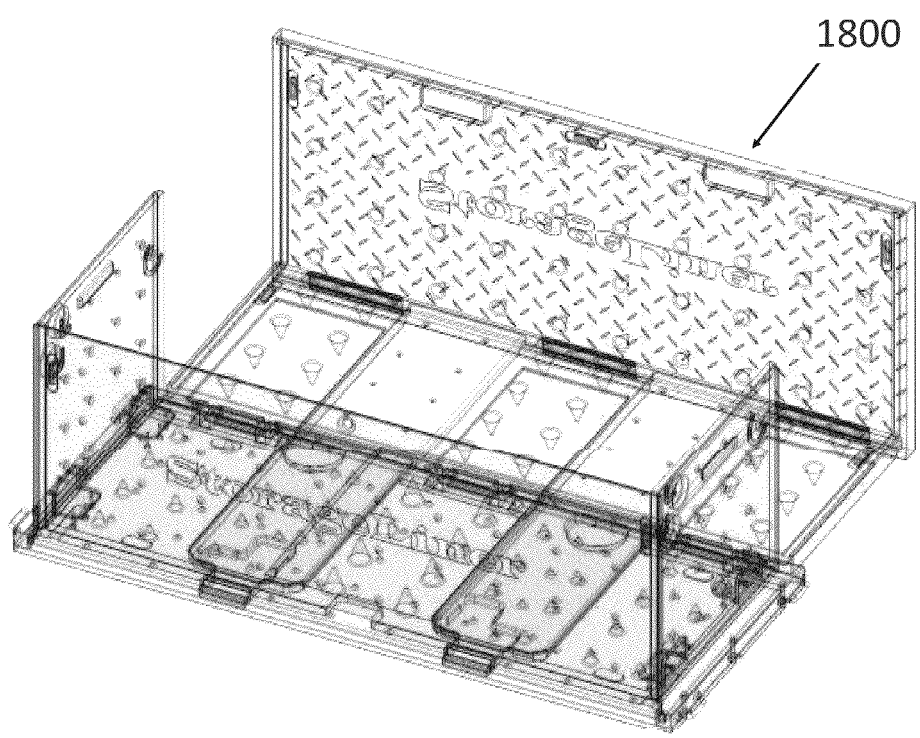
Figure 18P:
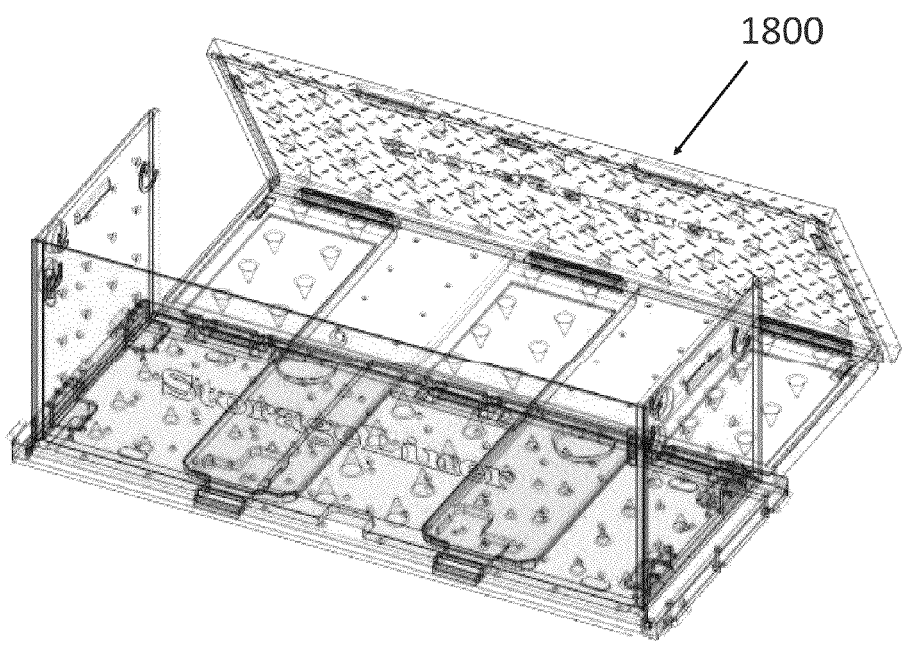
Figure 18Q:
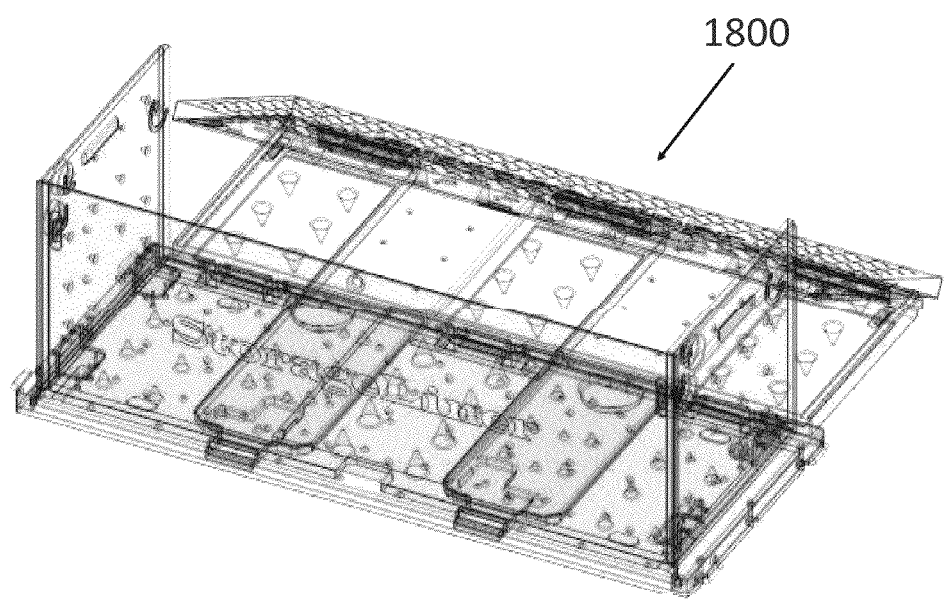
Figure 18R:
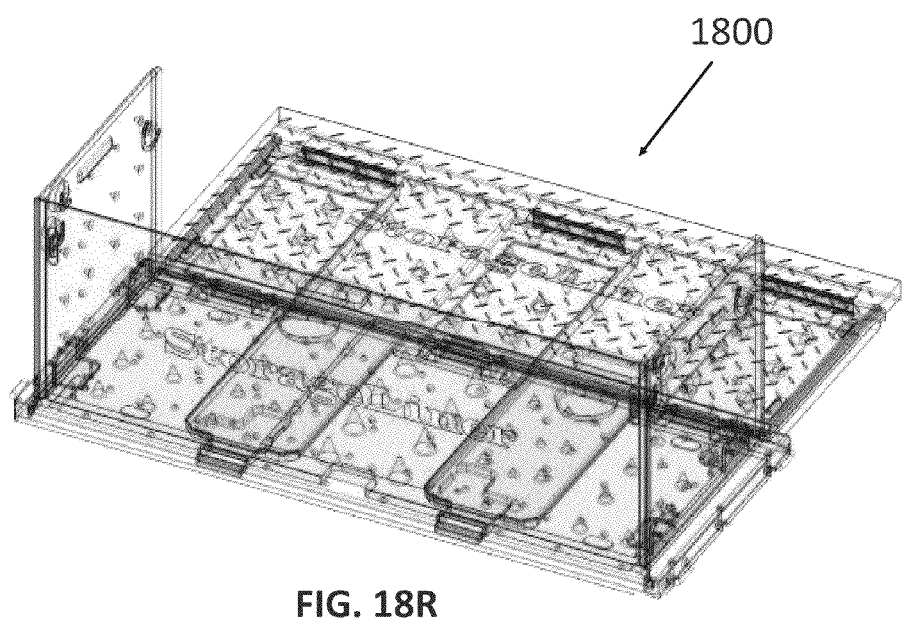

In the example of FIG. 18K, a back panel of the example container 1800 is moving away from the rest of the container 1800. Such backward movement continues in the example snapshot of FIG. 18L, Figure M, and FIG. 18N. In FIG. 18O, the back panel now lays in the plane of the base (e.g., on the vehicle bed, ground, trailer, etc.). In FIG. 18P, the top panel is folding toward the back panel, a movement that continues in the example of FIG. 18Q. In FIG. 18R, the top panel is now resting on top of the back panel.

Figure 18S:
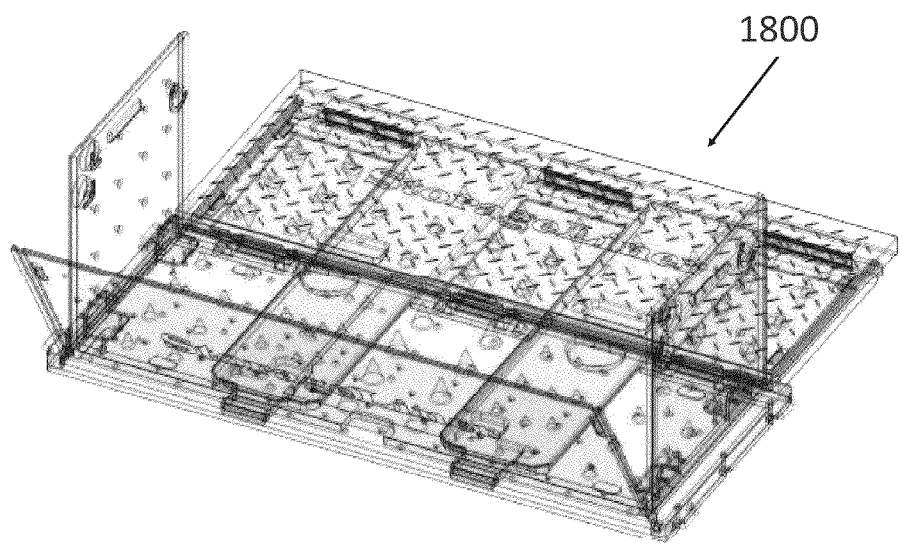
Figure 18T:
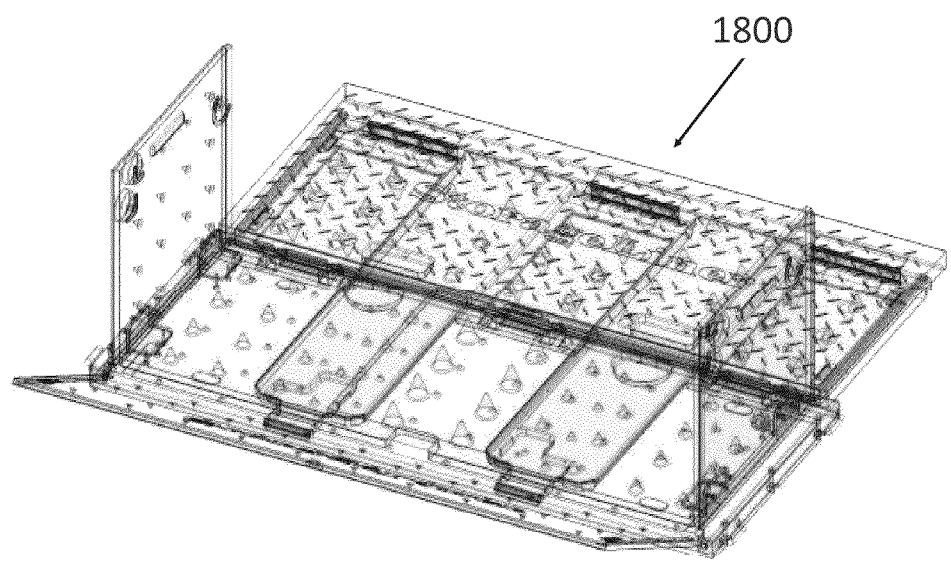
Figure 18U:
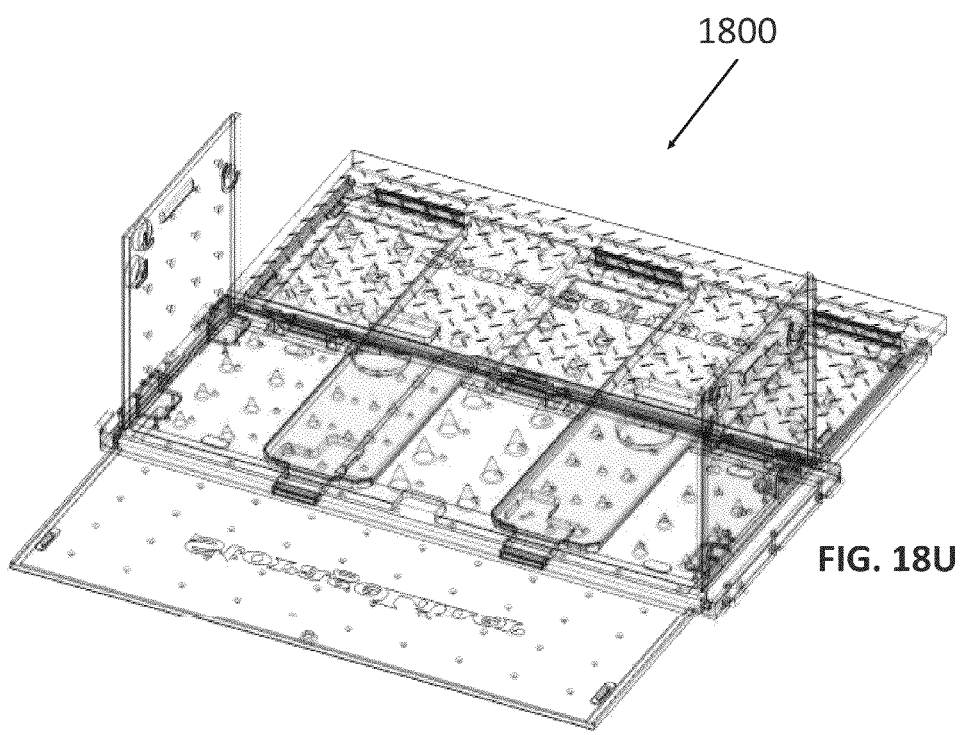

FIG. 18S illustrates movement of the front panel away from the interior of the container 1800 (e.g., away from contact with the side panels). This movement continues in the example snapshot of FIG. 18T. In FIG. 18U, the front panel lays flat in the plane of the base and back panels of the collapsing container 1800.

Figure 18V:
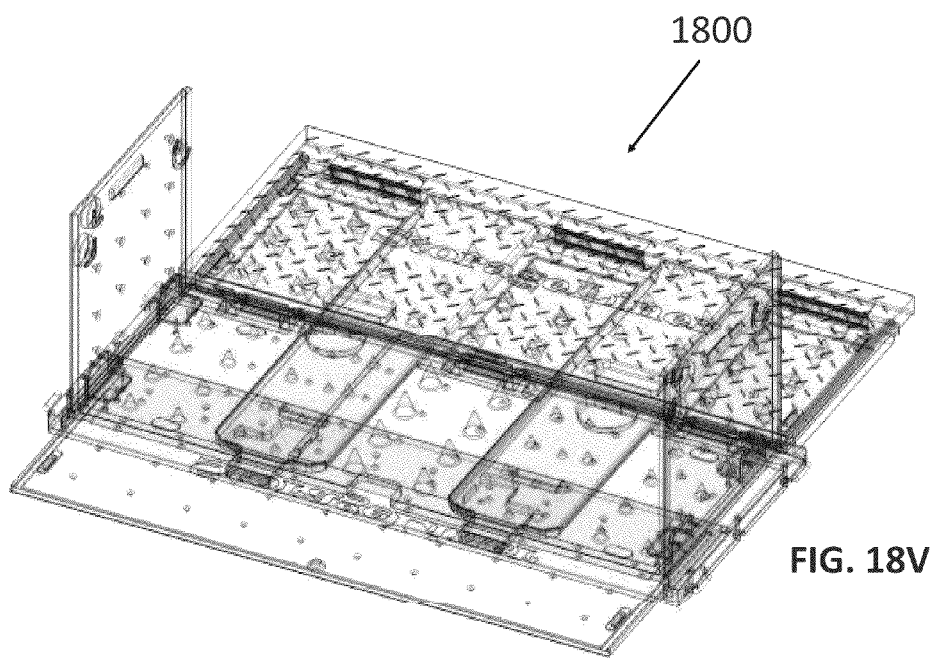
Figure 18W:
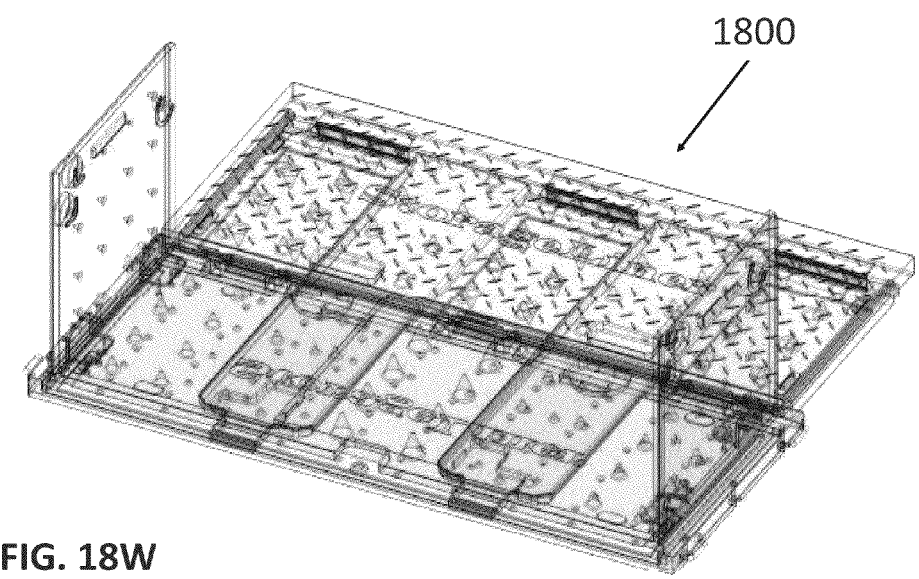
Figure 18X:
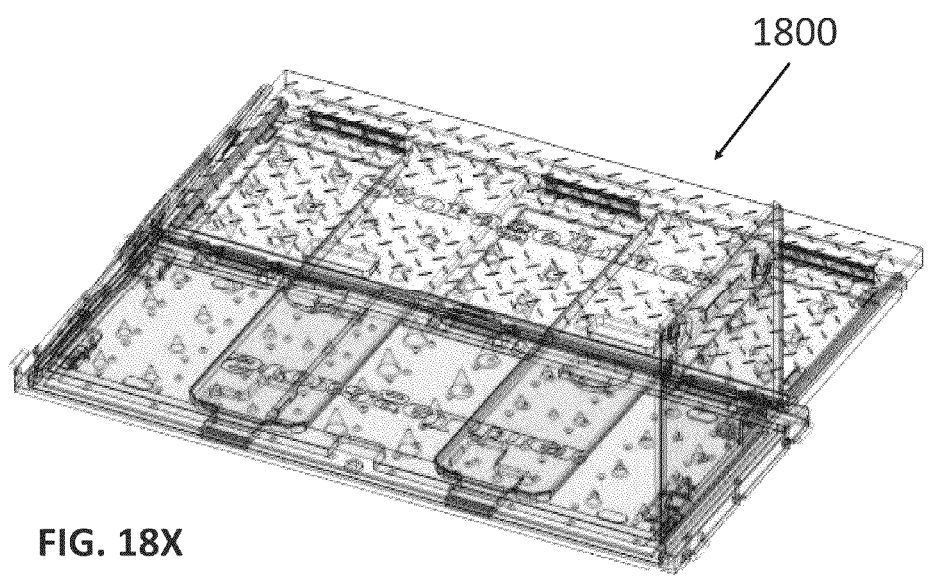
Figure 18Y:
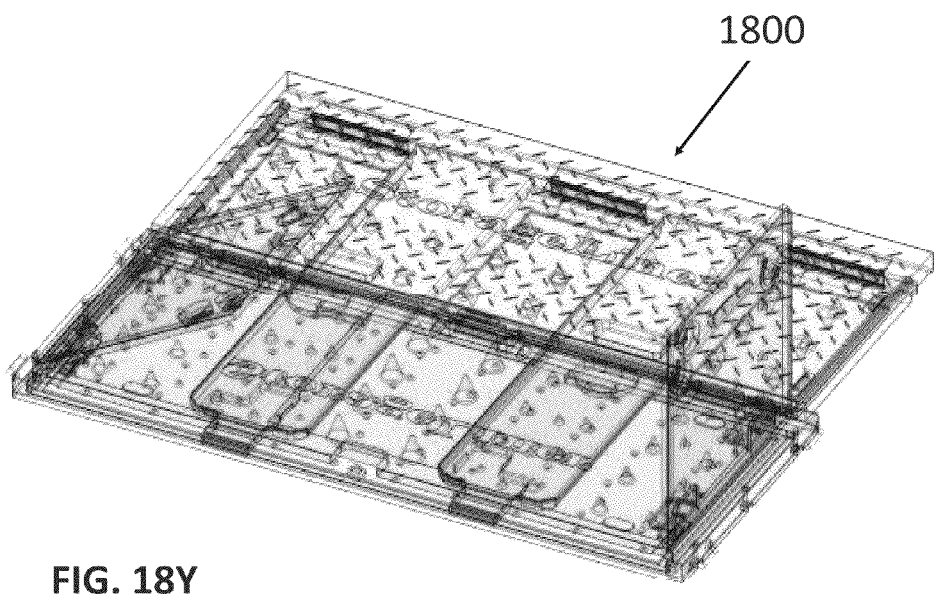
Figure 18Z:
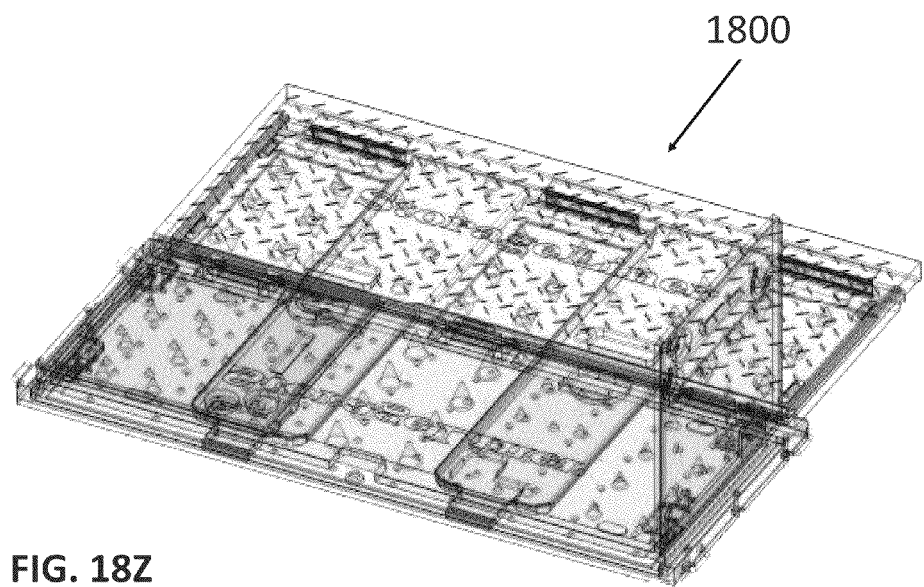
Figure 18A:
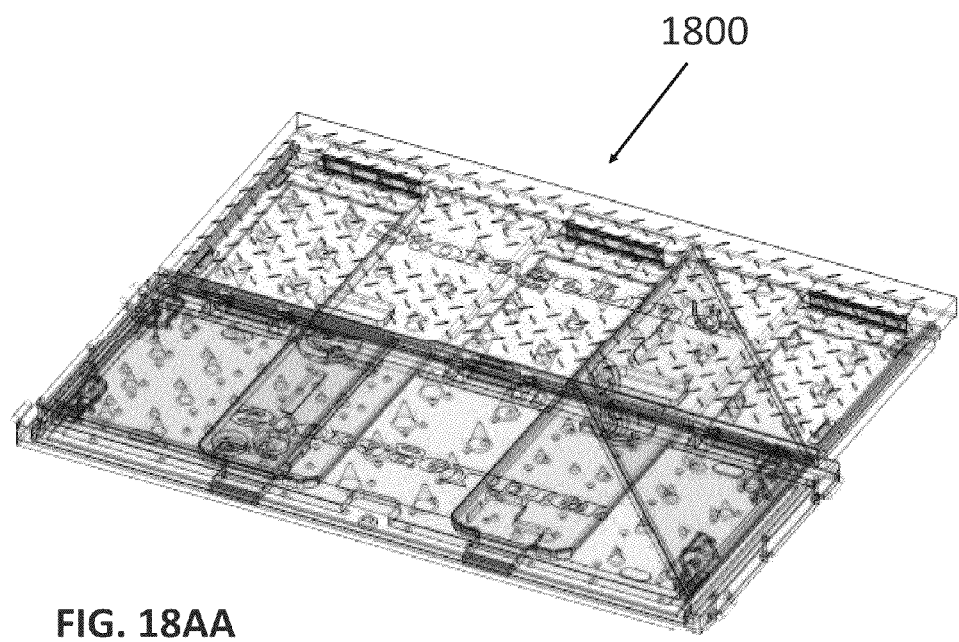
Figure 18B:
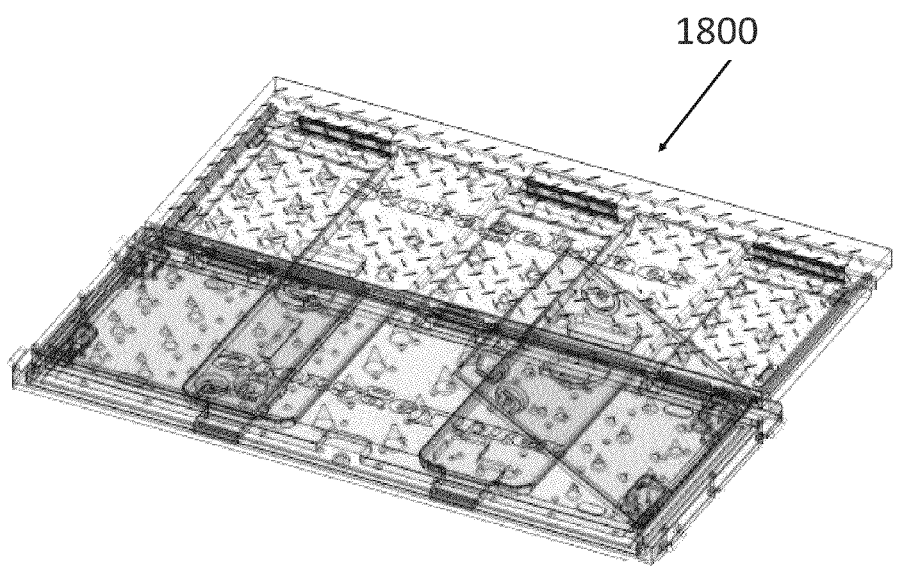
Figure 18C:
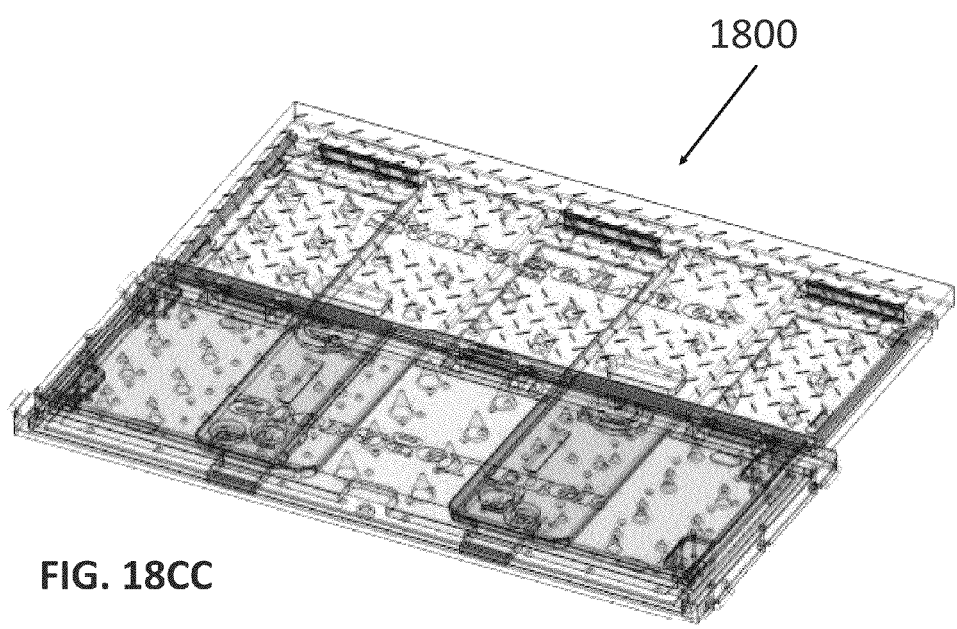

In FIG. 18V, the front panel begins its slide into the base (e.g., into a cavity between the base panel and a protective/shield bottom. In FIG. 18W, the front panel is positioned in the cavity under the base of the container 1800. The example snapshots of FIGS. 18X-18BB show first and second side panels folding toward the base of the container. FIG. 18CC shows the collapsible storage container 1800 in a fully collapsed configuration.

Conclusion

While the inventions have been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from the spirit or scope of the present inventions. Therefore, it is intended that the inventions not be limited to the particular embodiments disclosed herein.

The invention claimed is:

1. A collapsible automobile storage container, comprising:
a plurality of panels, arranged with respect to a base, that are connected and configured to form an enclosed storage area in a vehicle, wherein the plurality of panels are movable into both a collapsed position and an uncollapsed position and wherein the plurality of panels includes at least a top panel, a front panel, a back panel, and two side panels, the front panel movable to slide under the base of the container;
a connection system that connects the plurality of panels together, wherein the connection system allows the plurality of panels to be movable into the collapsed position and the uncollapsed position;
a support system attached to the front panel to provide support when the front panel is in the uncollapsed position, wherein the support system includes one or more trusses attached to the front panel to provide support to the base when the container is in the uncollapsed position, each of the one or more trusses having at a front and a side, the front of the truss being smaller than the side of the truss, the front of each truss attached to a bottom of the front panel, wherein the side of each truss is to be oriented along a direction of movement of the front panel to allow the one or more trusses to be pulled forward with the front panel and to provide support to the base; and
a bottom to cover the base of the collapsible storage container, the bottom and base together forming a cavity into which the front panel is movable to slide.

2. The collapsible storage container of claim 1, wherein the plurality of panels comprise at least one of plastic panels and metal panels.

3. The collapsible storage container of claim 1, wherein the vehicle comprises a truck, an all-terrain vehicle, a recreational vehicle, or a trailer.

4. The collapsible storage container of claim 1, wherein the connection system includes at least one of tapered latch hooks and rubber hooks.

5. The collapsible storage container of claim 1, wherein the connection system includes tongue and groove side panels.

6. The collapsible storage container of claim 1, wherein the collapsible storage container is incorporated into a liner for the vehicle.

7. The collapsible storage container of claim 1, wherein the collapsible storage container is configured for use either horizontally or vertically in a vehicle bed.

8. The collapsible storage container of claim 1, wherein the one or more trusses comprise a plurality of support trusses.

9. The collapsible storage container of claim 1, wherein one or more of the plurality of panels are connected together using a double pivot point hinge.

10. A system comprising:

a storage container that is configured to be moved into and out of a collapsed position, wherein the storage container includes a plurality of panels and an attachment system that is configured to connect the storage container to a bed of a vehicle and wherein the storage container includes an enclosed area that is located in a cargo area of the bed of the vehicle when the storage container is moved out of the collapsed position, the storage container providing a moisture-resistant enclosure using at least one of a tapered latch hook system and a tongue and groove panel system, the storage container further comprising one or more trusses attached to a front panel of the storage container to provide support to a base of the storage container when the front panel is in the uncollapsed position, each of the one or more trusses having at a front and a side, the front of the truss being smaller than the side of the truss, the front of each truss attached to a bottom of the front panel, wherein the side of each truss is to be oriented along a direction of movement of the front panel to allow the one or more trusses to be pulled forward with the front panel and to provide support to the base, the front panel arranged to slide under the base of the storage container; and a bottom to cover the base of the storage container, the bottom and base together forming a cavity into which the front panel is movable to slide.

11. The system of claim 10, wherein the enclosed area forms the interior of the collapsible storage container.

12. The system of claim 11, wherein the storage container is weather-resistant to protect one or more items placed in the enclosed area when out of the collapsed position.

13. The system of claim 10, further comprising a connection system that connects two or more panels of the storage container together and allows the storage container to move into and out of the collapsed position.

14. The system of claim 13, wherein the connection system comprises at least one double pivot point hinge connecting one or more of the plurality of panels.

15. The system of claim 10, wherein the storage container is incorporated into a liner for the vehicle.

16. The system of claim 10, wherein the collapsible storage container is configured for use either horizontally or vertically in a vehicle bed.

17. The system of claim 10, wherein the one or more trusses comprise a plurality of support trusses.

18. The system of claim 10, wherein the vehicle comprises a truck, an all-terrain vehicle, a recreational vehicle, or a trailer.

* * * * *

UNITED STATES PATENT AND TRADEMARK OFFICE
CERTIFICATE OF CORRECTION

PATENT NO. : 9,132,785 B2  
APPLICATION NO. : 14/076926  
DATED : September 15, 2015  
INVENTOR(S) : Robert Roach and Craig Wieland Page 1 of 1

It is certified that error appears in the above-identified patent and that said Letters Patent is hereby corrected as shown below:

In the Claims

Column 26 line 5 (claim 11), between the word "the" and "storage" delete the word "collapsible".

Signed and Sealed this
Second Day of February, 2016

Michelle K. Lee
*Director of the United States Patent and Trademark Office*